United States Patent [19]
King et al.

[11] Patent Number: 5,607,317
[45] Date of Patent: Mar. 4, 1997

[54] ELECTRICAL POWERWAY FOR FURNITURE PANEL

[75] Inventors: Steven J. King, Park Township, Ottawa County; David E. Emery, Laketon Township, Muskegon County; Richard D. Benscoter, Holland, all of Mich.

[73] Assignee: Haworth, Inc., Holland, Mich.

[21] Appl. No.: 363,750

[22] Filed: Dec. 23, 1994

[51] Int. Cl.⁶ ................................................. H01R 25/00
[52] U.S. Cl. ............................................ 439/215; 439/211
[58] Field of Search .................................... 439/211, 215

[56] References Cited

U.S. PATENT DOCUMENTS

| | | |
|---|---|---|
| Re. 31,733 | 11/1984 | Haworth et al. . |
| 4,043,626 | 8/1977 | Propst et al. . |
| 4,135,775 | 1/1979 | Driscoll . |
| 4,203,639 | 5/1980 | VandenHoek et al. . |
| 4,231,630 | 11/1980 | Propst et al. . |
| 4,235,495 | 11/1980 | Propst et al. . |
| 4,255,611 | 3/1981 | Propst et al. . |
| 4,313,646 | 2/1982 | Millhimes et al. . |
| 4,370,008 | 1/1983 | Haworth et al. . |
| 4,377,724 | 3/1983 | Wilson . |
| 4,382,648 | 5/1983 | Propst et al. . |
| 4,429,934 | 2/1984 | VandenHoek et al. . |
| 4,666,223 | 5/1987 | Tillmann . |
| 4,688,869 | 8/1987 | Kelly ........................ 439/209 |
| 4,781,609 | 11/1988 | Wilson et al. ............. 439/215 |
| 4,825,540 | 5/1989 | Kelly ........................ 29/861 |
| 4,918,886 | 4/1990 | Benoit et al. ............. 52/221 |
| 4,952,164 | 8/1990 | French et al. ............ 439/215 |
| 5,013,252 | 5/1991 | Nienhuis et al. ......... 439/215 |
| 5,032,086 | 7/1991 | Skowronski et al. .... 439/215 |
| 5,046,963 | 9/1991 | Kelly ........................ 439/211 |
| 5,092,786 | 3/1992 | Juhlin et al. ............. 439/215 |
| 5,096,433 | 3/1992 | Boundy .................... 439/215 |
| 5,112,240 | 5/1992 | Nienhuis et al. ......... 439/215 |
| 5,131,860 | 7/1992 | Bogiel ...................... 439/215 |
| 5,152,698 | 10/1992 | Juhlin et al. ............. 439/215 |
| 5,158,472 | 10/1992 | Juhlin ...................... 439/215 |
| 5,164,544 | 11/1992 | Snodgrass et al. ....... 439/215 |
| 5,203,711 | 4/1993 | Bogiel ...................... 439/215 |
| 5,203,713 | 4/1993 | French et al. ............ 439/215 |
| 5,214,889 | 6/1993 | Nienhuis et al. ......... 439/215 |
| 5,236,370 | 8/1993 | King et al. ............... 439/215 |
| 5,244,401 | 9/1993 | Russell et al. ............ 439/215 |
| 5,252,086 | 10/1993 | Russell et al. ............ 439/215 |
| 5,277,609 | 1/1994 | Ondrejka .................. 439/215 |
| 5,318,454 | 6/1994 | Deer et al. ................ 439/215 |
| 5,362,923 | 11/1994 | Newhouse et al. ....... 174/48 |
| B1 4,367,370 | 6/1987 | Wilson et al. . |

OTHER PUBLICATIONS

"Race® Power Distribution Assembly" brochure, Haworth, Inc., 1992.
"The Power Base™ Receptacles" brochure, Haworth, Inc., 1993.
"The Power Base™ Raceway" brochure, Haworth, Inc., 1993.
"The Power Base™ Base Feeds" brochure, Haworth, Inc., 1993.
"The Power Base™ Installation Procedures" brochure, Haworth, Inc., 1986.
Herman Miller drawings (2 sheets), one dated Nov. 18, 1976.

*Primary Examiner*—Gary F. Paumen
*Attorney, Agent, or Firm*—Flynn, Thiel, Boutell & Tanis, P.C.

[57] ABSTRACT

A modular electrical system for mounting on furniture components such as wall panels. The system includes modules which each include at least one power block provides increased electrical circuit capacity, which capacity in the preferred embodiment is at least six electrical circuits. The power block provides different groupings of circuits which are externally accessible, such as for connection to removable receptacle units, on opposite sides thereof. Flexible electrical connectors are provided for connection to and transmitting electrical power between power blocks of adjacent panels. Each connector transmits only one grouping of electrical circuits therethrough, whereby two such connectors are normally utilized for connection between adjacent power blocks of adjacent panels to transmit all electrical circuits therebetween. The individual flexible electrical connectors can be used for transmitting electrical energy into branching panels, which branching panels may be provided with only the selected grouping of circuits.

24 Claims, 20 Drawing Sheets

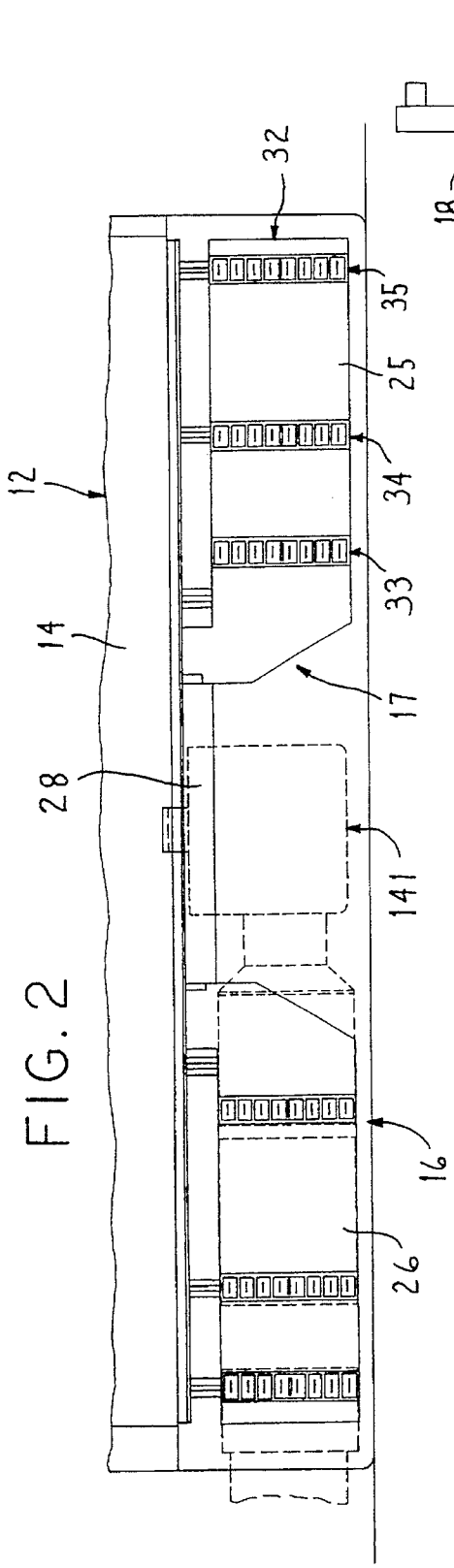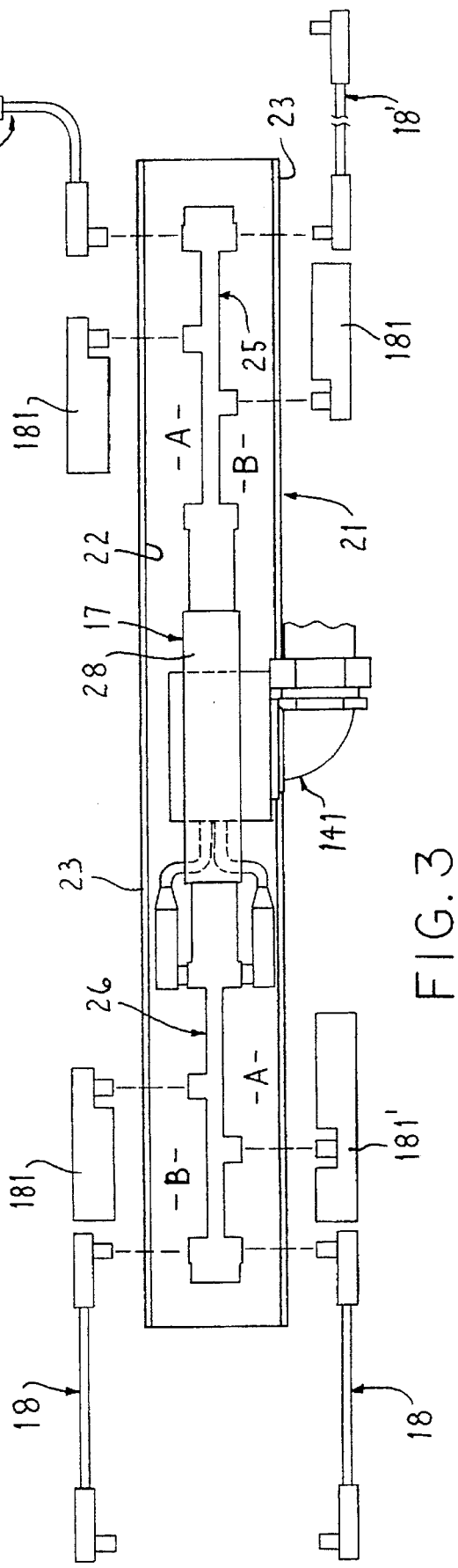
FIG. 2
FIG. 3

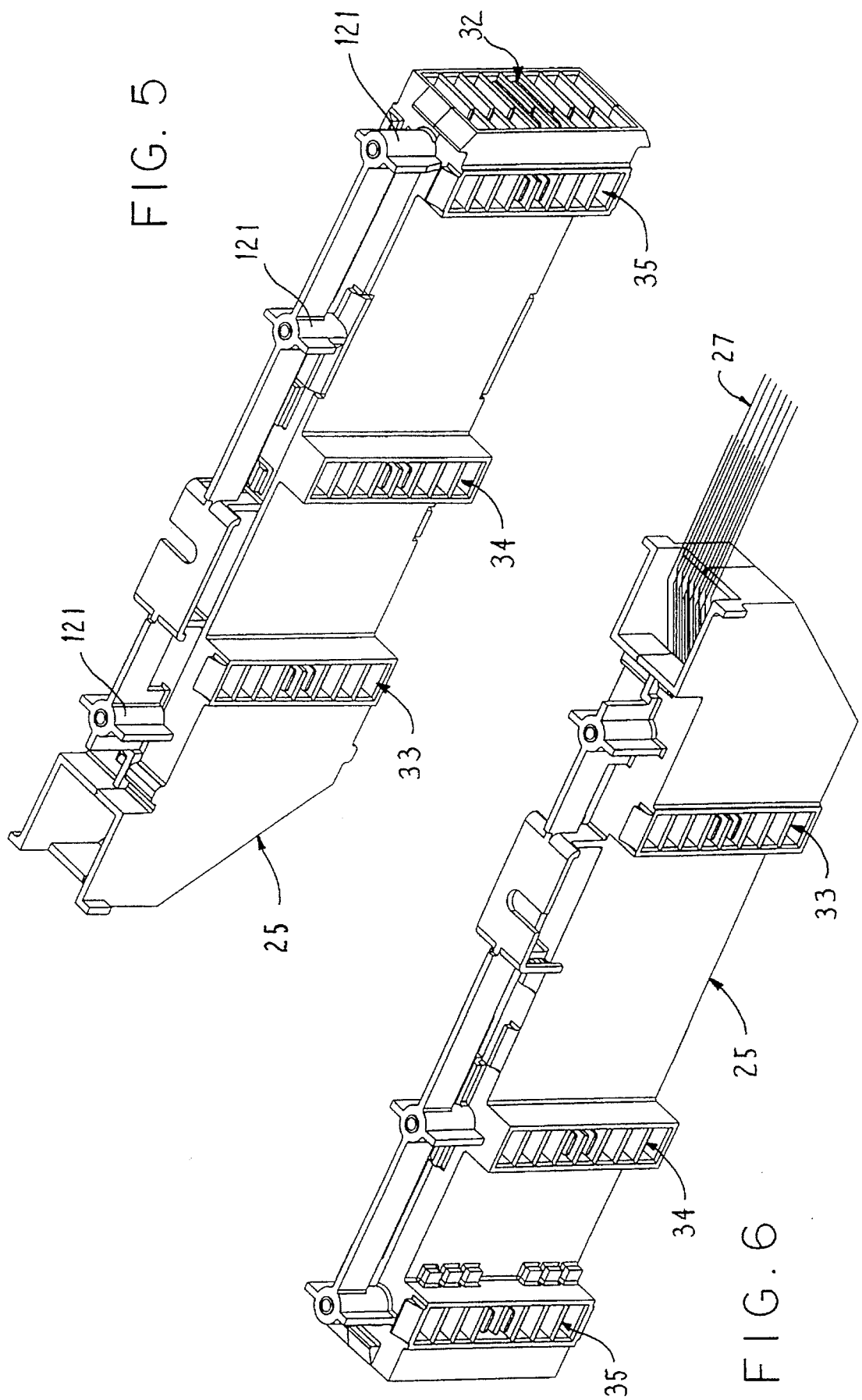

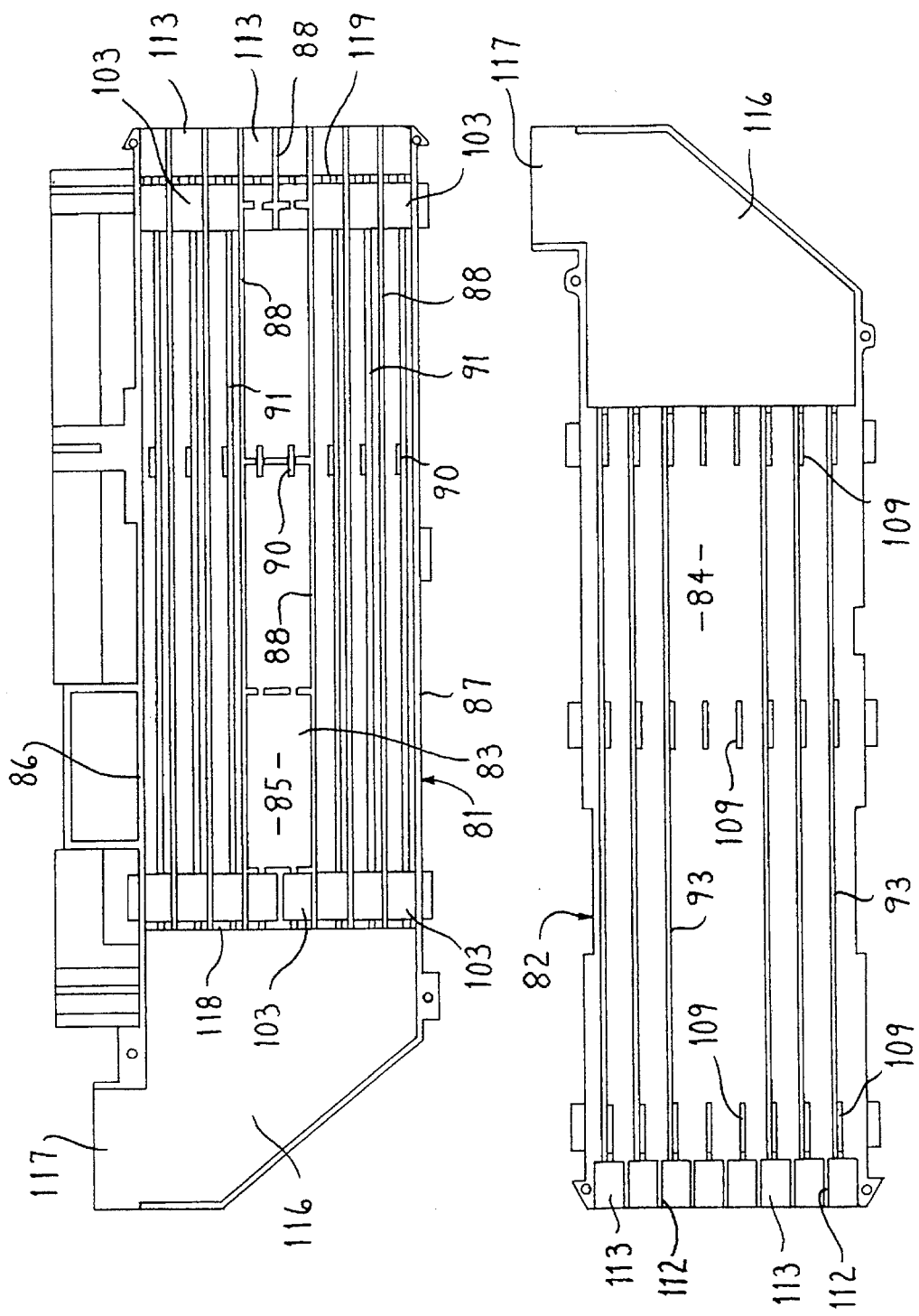

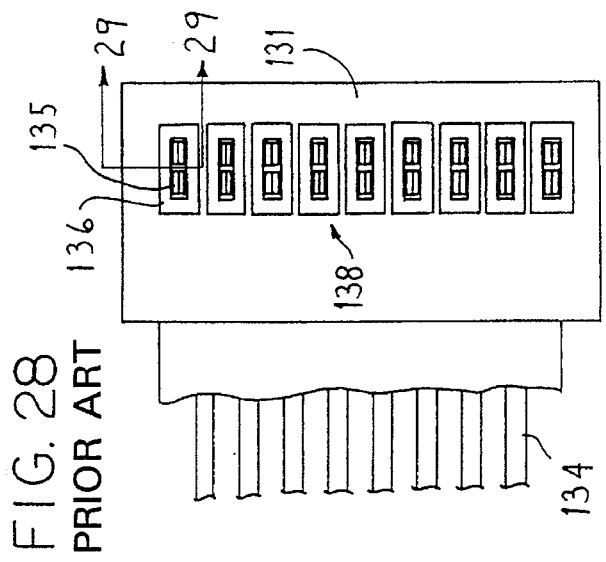
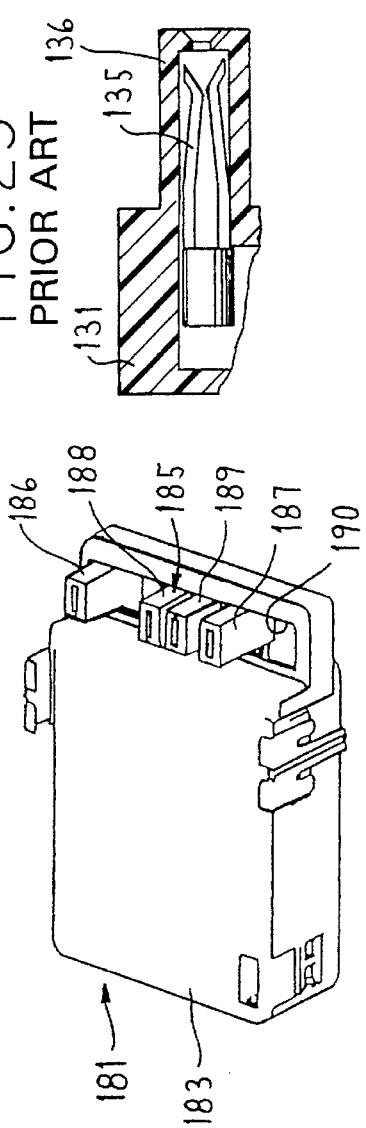
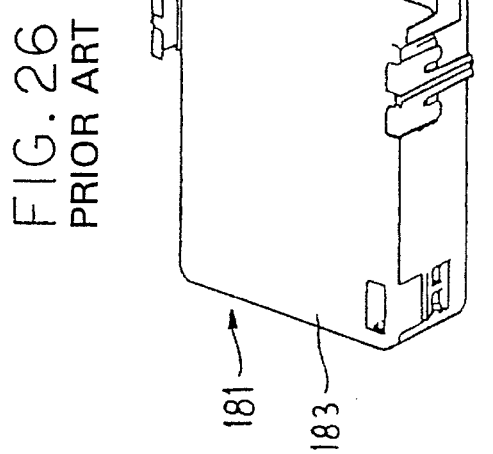
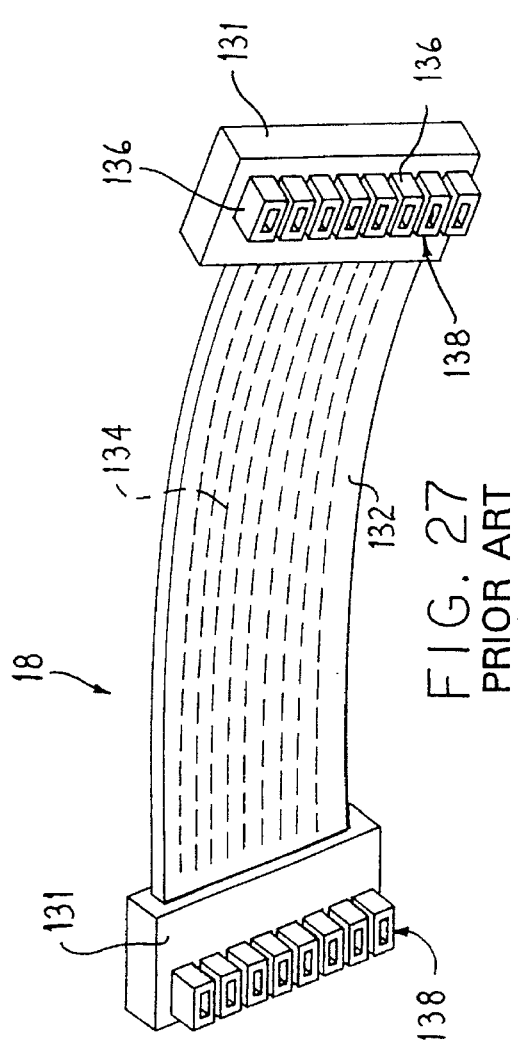
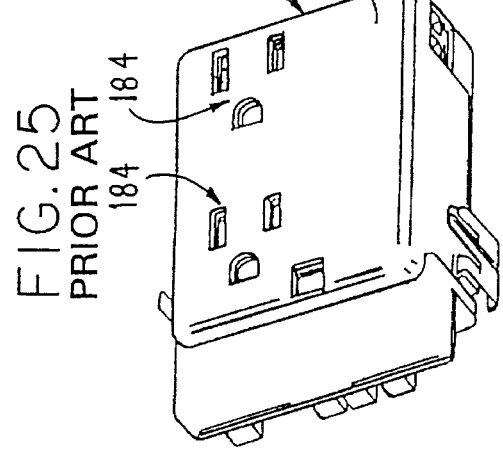

ELECTRICAL POWERWAY FOR FURNITURE PANEL

FIELD OF THE INVENTION

This invention relates to a modular electrical system for use on office furniture such as interior space-dividing wall panels and, more particularly, to an improved system having significantly increased circuit capacity which permits different groupings of circuits to be accessible at different use locations, and which provides a small and compact arrangement while providing significant circuit capacity.

BACKGROUND OF THE INVENTION

Office furniture and specifically interior space-dividing wall panels are conventionally utilized to divide large open spaces into smaller work areas, commonly referred to as workstations. The wall panels which are interconnected to define the workstations are conventionally provided with a modular electrical system thereon to facilitate the supply of electricity to the various workstations, and hence avoid the necessity of extensive installation of hard electrical wiring to the workstations. These modular electrical systems, which are typically manufactured in the factory and are installed on the panels at the factory or are readily field installed, are commonly provided in a channel-like raceway which extends along the lower edge of the panels, although in some panel systems the electrical system extends at other elevations, such as along the top of the panel or at worksurface (i.e., desk) height.

With the greatly increased usage of numerous types of electrical equipment, including computers, within the office environment, there has been a demand for increased electrical capacity at the various workstations, and at the same time this increased capacity must be able to provide a dedicated or isolated circuit for selected usages such as for computers. To meet this demand, many of the known modular electrical systems as associated with such wall systems have increased the number of available electrical circuits which extend along the wall system, and at present most modular electrical systems available in this industry typically provided three or four electrical circuits, one or more of which may be isolated or dedicated, such as for computer usage. With these known systems, however, the number of workstations and the number of electrical outlets which can be supplied with electricity from a single power source, such as a single floor, wall or ceiling power monument, is limited by the number of available circuits which the system is capable of providing. Further, most of these known and typically available systems do not provide any significant capability for making only selected circuits available at various workstations or locations.

While recent attempts have been made to provide system of the aforementioned type which possesses the capability of increasing the electrical capacity by increasing the number of circuits, nevertheless the known systems of this type have heretofore been structurally and operationally complex in that they have typically required more extensive layout and planning of the system prior to installation of the wall system or prior to mounting of the electrical system thereon, or have increased the number of selectable connection which must be made at the job site which increases the probability of an improper connection being made.

Examples of modular electrical systems used on office furniture, and specifically furniture space-dividing panels, are illustrated in U.S. Pat. Nos. 4,060,294, 4,203,639, 4,370,008, 4,376,561, 4,429,934, 4,781,609, 5,152,698, 5,236,370, 5,252,086, 5,277,609, and 5,318,454.

According to the present invention, there is provided an improved modular electrical system for mounting on furniture components and specifically interior space-dividing wall panels, which electrical system includes modules which each include at least one power block which mounts on the panels and which provide increased electrical circuit capacity, which capacity in the illustrated embodiment is at least six electrical circuits. The power block provides different groupings of circuits which are externally accessible, such as for connection to removable receptacle units, on opposite sides thereof. The grouping of circuits on each side of the power block in the disclosed embodiment includes three circuits. Flexible electrical connectors are provided for connection to and transmitting electrical power between the power blocks of adjacent panels. Each flexible connector transmits only one grouping of electrical circuits therethrough, whereby two such flexible connectors are normally utilized for connection between adjacent power blocks of adjacent main or spine panels to transmit all electrical circuits therebetween. As an alternative, the individual flexible electrical connectors can be used for transmitting electrical energy into branching panels, which branching panels may be provided with only the selected grouping of circuits, rather than all of the circuits associated with the power block of the main panel, whereby two different panel branches can be provided with different groupings of circuits.

In the improved arrangement of the present invention, as aforesaid, the flexible connectors as well as the power blocks and related electrical components associated with the branch panels, which branch panels receive only a selected grouping of three circuits, may be conventional components associated with a standard eight-wire three-circuit system currently sold by the Assignee hereof under the name "The Power Base", which system substantially corresponds to the system disclosed in U.S. Pat. No. 4,781,609. The improved electrical system of this invention can be readily integrated with and used in conjunction with the existing three-circuit Power Base system to facilitate the supplying of electrical power and circuits to an increased number of workstations with greater flexibility while at the same time being compatible so as to permit use of the existing Power Base system, either already in place or newly supplied, thereby providing more efficient and economical utilization of overall equipment while at the same time providing increased flexibility and capability with respect to management of electrical power.

In the improved electrical system of this invention, as aforesaid, power is most conventionally supplied to the system from a floor monument by a base feed assembly. This base feed assembly includes a supply block which mounts on the panel, typically in the raceway between a pair of power blocks which are also mounted on the same panel, and the supply block has a pair of flexible connectors extending therefrom for plug-in connection to at least one of the power blocks. Each flexible power-supply connector transmits therethrough only a selected grouping of circuits, such as three circuits in the illustrated embodiment, so that each connector plugs into a separate terminal on the power block to permit all electrical circuits (six in the illustrated embodiment) to be supplied to the power blocks and hence to the modular electrical system.

As an alternative, the improved power system of this invention, as aforesaid, can utilize a ceiling or top feed assembly for supplying electrical power from a ceiling power source to the electrical system. This ceiling feed system also plugs into one or more terminals on the power block so as to supply all electrical circuits to the modular electrical system.

In the improved electrical system, as aforesaid, the power block is of a compact hollow structure having a height which is significantly greater than its width, and a plurality of electrically conductive plates are supported in insulatively spaced relation, generally vertically spaced relation, within the power block housing. Preferably at least fourteen such conductive plates are supported in a vertically stacked array, and define at least six electrical circuits. The vertically alternate conductive plates have sidewardly projecting contacts which cooperate with the housing to define sidewardly-accessible electrical terminals on opposite sides of the housing for receiving power, for external tap-off of power, and for transfer of power from panel to panel. The terminals accessible from one side of the power block define a first grouping of circuits, typically three circuits. Similarly, the terminals accessible from the other side of the power block define a second grouping of circuits, namely three circuits, with the circuits of the first and second groupings being totally different from one another.

Other objects and purposes of the invention will be apparent to persons familiar with systems of this general type upon reading the following specification and inspecting the accompanying drawings.

BRIEF DESCRIPTION OF THE DRAWINGS

FIG. 2 is a fragmentary enlarged elevational view showing the electrical system of this invention associated with a bottom edge of a wall panel.

FIG. 3 is a diagrammatic plan view illustrating the modular powerway of the electrical system associated with one panel, and the flexible connectors which electrically connect the powerway to adjacent panels.

FIGS. 5 and 6 are perspective views which illustrate opposite sides of a power block associated with the modular powerway.

FIGS. 9 and 10 are side elevational views which respectively show the inside of the two power block housing parts.

FIGS. 25 and 26 are perspective views which respectively show the front and rear sides of a known switchable receptacle unit which can be detachably coupled to either side of each power block.

FIG. 27 is a perspective view illustrating a known flexible electrical connector which is used for transferring electrical power between the power blocks of adjacent panels.

FIG. 28 is a fragmentary sectional view of one end of the flexible connection of FIG. 27.

FIG. 29 is an enlarged fragmentary sectional view along line 29—29 in FIG. 28.

Figure 1:
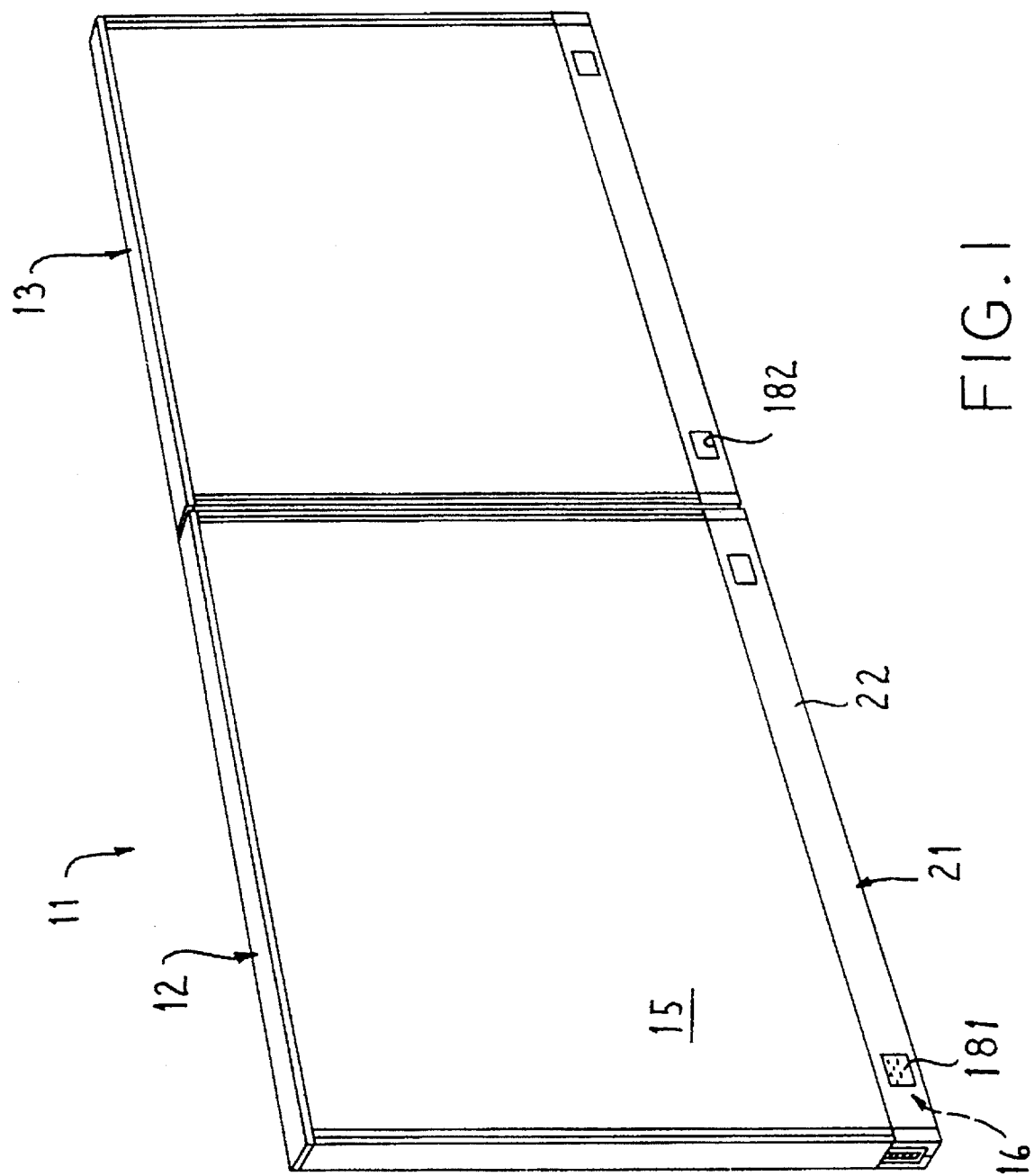
FIG. 1 is a perspective view illustrating two serially connected interior wall panels, which panels mount thereon the improved electrical system.

Certain terminology will be used in the following description for convenience in reference only, and will not be limiting For example, the words "upwardly", "downwardly", "rightwardly" and "leftwardly" will refer to directions in the drawings to which reference is made. The words "inwardly" and "outwardly" will refer to directions toward and away from, respectively, the geometric center of the panel or powerway and designated parts thereof. Said terminology will include the words specifically mentioned, derivatives thereof, and words of similar import.

DETAILED DESCRIPTION

Referring to FIG. 1, there is illustrated a wall system 11 formed from a series of interconnected upright prefabricated panels, only two substantially identical panels 12 and 13 being illustrated. Panels of different heights and lengths can be serially connected in aligned or angled relation as is conventional and well known.

Each panel, such as the panel 12, includes an internal rigid rectangular frame formed by parallel top and bottom rails rigidly joined together by parallel side rails, the bottom rail 14 being partially illustrated in FIG. 2. These rails are typically channel-shaped and open inwardly of the panel, whereby the frame confines therein a suitable core structure, such as a honeycomb layer or similar conventional structure.

The core and frame are normally sandwiched between thin facing sheets disposed on opposite sides of the frame, which sheets in turn are normally covered by a suitable fabric, the latter defining exterior side surfaces 15 of the panel, which side surfaces are normally vertically enlarged planar surfaces.

To provide access to electrical power in work areas or workstations defined by or adjacent the wall system, an electrical system 16 is associated with and extends along the wall system. The electrical system 16, as diagrammatically illustrated in FIGS. 2 and 3, includes an electrically prewired modular powerway 17 which is adapted for attachment to an individual panel, such as the panel 12 in FIG. 2, with a plurality of serially connected such panels each having a powerway 17 mounted thereon. These powerways 17 as provided on adjacent panels are then electrically connected together by panel-to-panel connectors 18 (hereinafter referred to as "jumpers") which create a releasable pluglike electrical connection with the adjacent powerways.

The powerway 17 can also have a power feed unit 141 coupled thereto to supply electrical power into the system 16 from an external power source. One or more removable output units 181, commonly referred to as receptacle units, can also be engaged with the powerway 17 to provide electrical access for conventional plugs associated with devices such as typewriters, computers and the like.

The powerway 17 is typically positioned within a utility raceway 21 which is associated with the panel and extends longitudinally therealong, which utility raceway conventionally and commonly extends along the lower edge of the panel directly adjacent the floor. This raceway 21 defines an elongate channel or space 22 which extends longitudinally throughout the length of the panel and is defined between generally parallel side covers 23 which secure to the panel for enclosing the channel. These side covers 23 are generally removable, and are substantially flush with or disposed slightly outwardly relative to the adjacent panel side surfaces 15.

Figure 4:
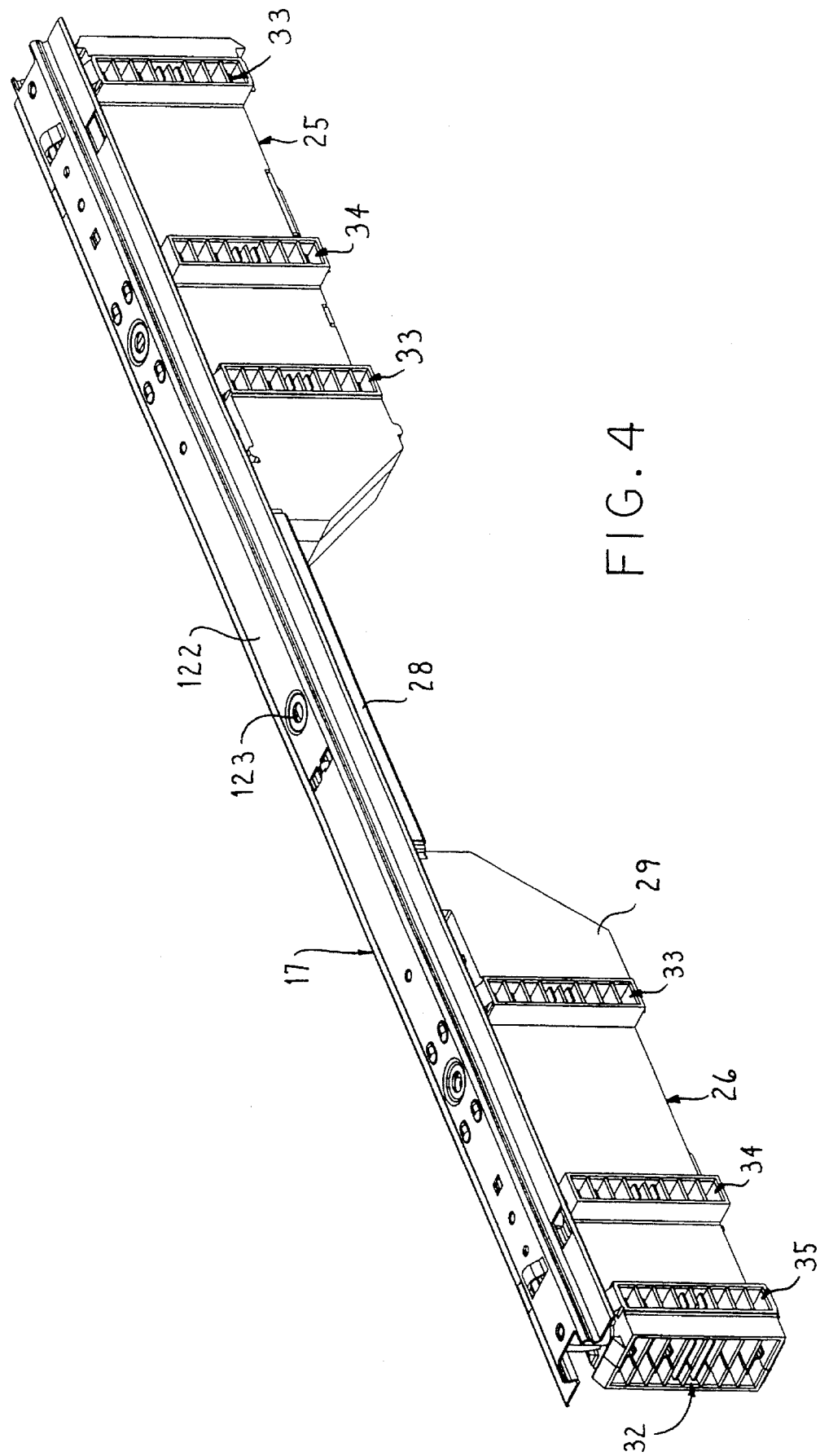
FIG. 4 is a perspective view which illustrates the modular powerway which attaches to a single panel.

As illustrated by FIGS. 2–4, the modular powerway 17 includes at least one and preferably a pair of substantially identical power blocks 25 and 26 which are longitudinally spaced apart and are coupled together by a raceway 28 which extends therebetween, the latter containing therein a plurality of conductors or wires 27 (FIG. 6) which at opposite ends project into the interior of the power blocks 25 and 26. The plurality of wires 27, in the preferred embodiment, include fourteen conductors which are grouped so as to define six separate electrical circuits which extend along the modular powerway 17 and hence along the electrical system, as explained hereinafter.

The power blocks 25 and 26 are substantially identical, and in fact structurally and functionally correspond to one another except that the one power block is rotated horizontally 180° relative to the other power block, so that only the power block 25 will be described below.

Figure 7:
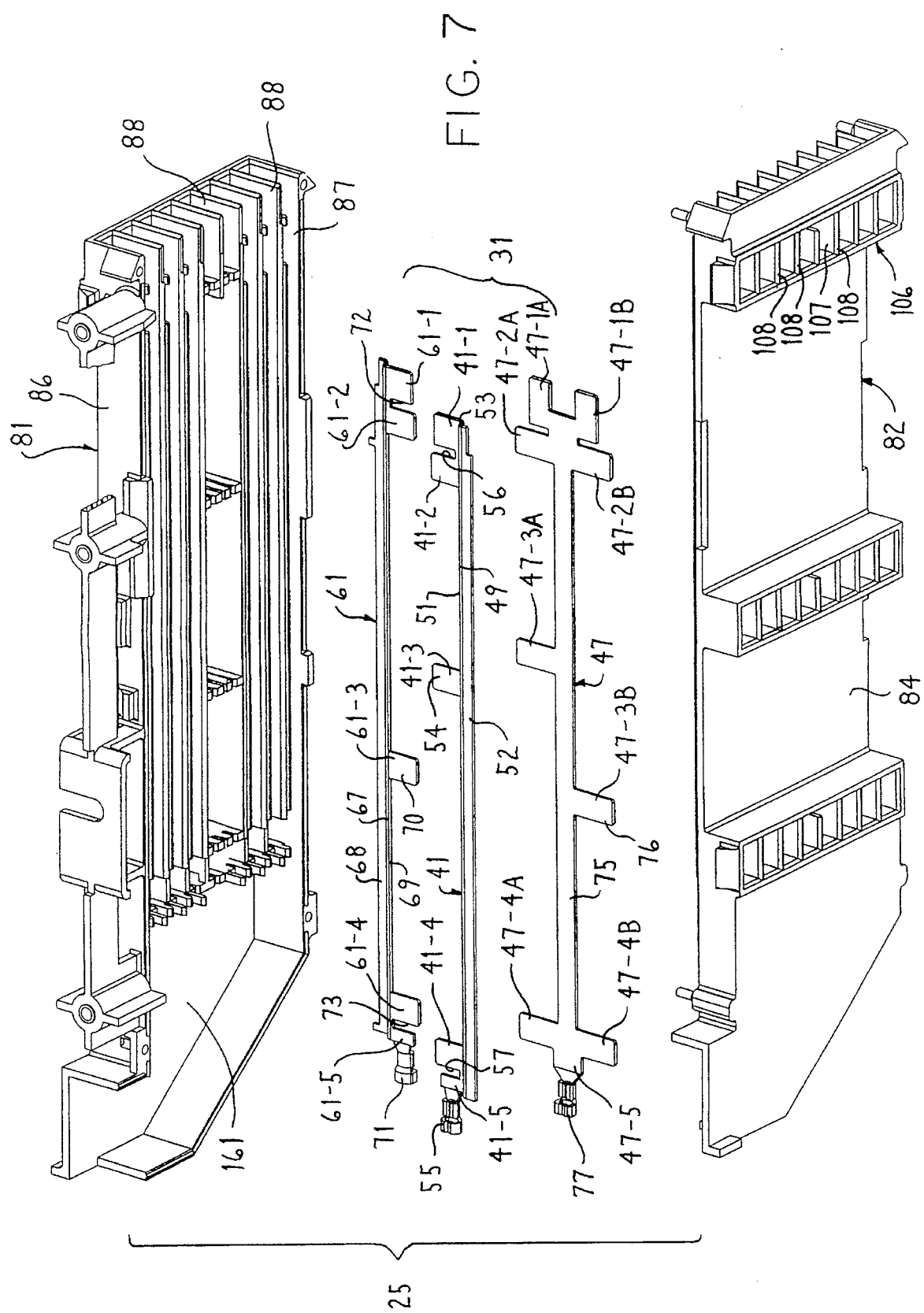
FIG. 7 is an exploded perspective view of the power block.
Figure 11:
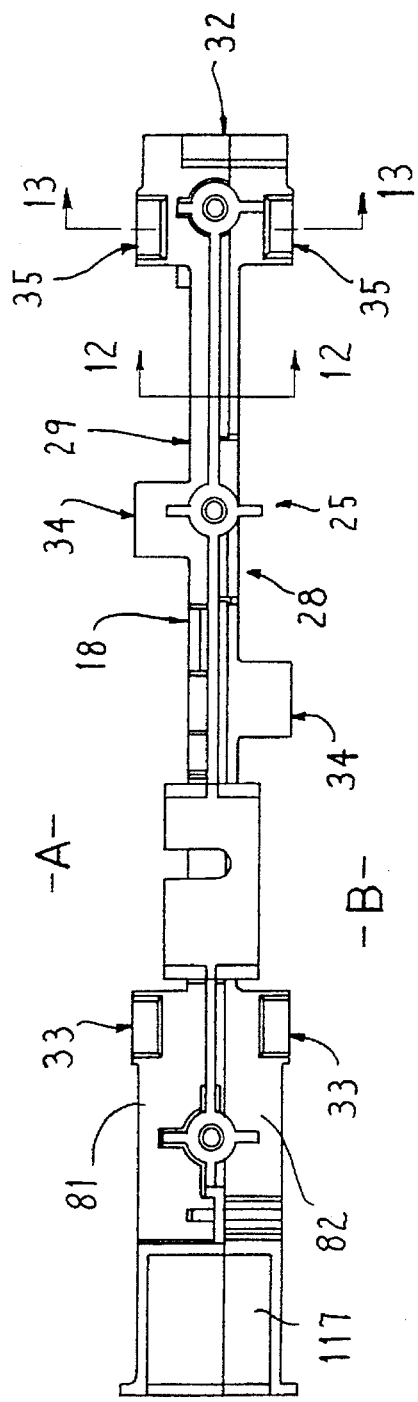
FIG. 11 is a top view of the power block.
Figure 8:
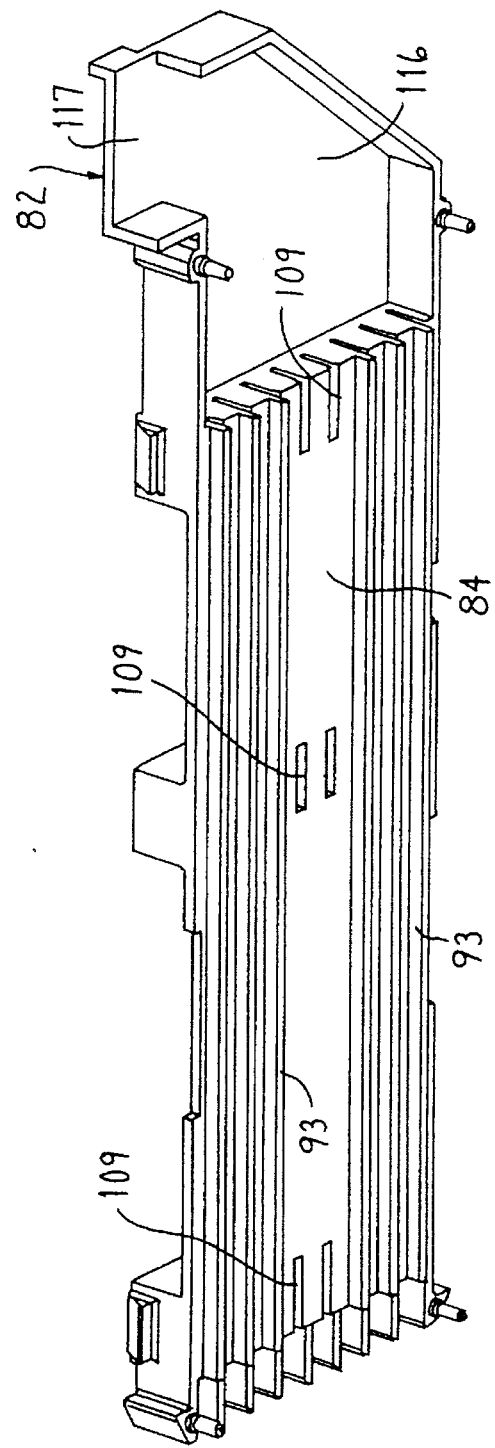
FIG. 8 is a perspective view showing the inner side of the lowermost housing part shown in FIG. 7.

The power block 25 includes a hollow housing 29 in which a plurality of longitudinally elongate conductive elements or plates 31 are mounted in spaced relation from one another. The number of such conductive plates 31 corresponds to the number of conductive wires 27, this being fourteen plates 31 in the illustrated embodiment, although only three such plates are shown in FIG. 7 for convenience of illustration. Each of the conductive plates 31 is joined to a respective one of the conductive wires 27.

The power block 25 defines thereon an electrical port 32 which is defined at the outer end of the power block and is oriented so as to be accessible in the longitudinal direction thereof, this port 32 also being oriented toward the adjacent end of the panel. The electrical port 32 functions as a terminal for permitting electrical power to be supplied to and from the powerway, and may herein be referred to as an input/output port or terminal assembly.

Power block 25 has a further pair of electrical ports 33 formed thereon adjacent the opposite end thereof, namely adjacent the inner end of the power block, with these ports 33 being generally transversely aligned relative to the power block and oriented so as to face or open outwardly in opposite directions toward the opposite sides of the respective panel. These electrical ports 33 are also used for inputting of electrical power to the powerway, and may also be referred to as input ports or terminal assemblies.

A still further pair of electrical ports 34 are provided on the power block 25, these also being disposed on opposite sides of the power block and transversely oriented so as to face outwardly toward opposite sides of the panel. These ports 34 are disposed intermediate the longitudinal ends of the power block and, in the illustrated embodiment, are longitudinally displaced from one another. The ports 34 cooperate with output units, such as receptacle units 181, and may herein be referred to as output ports or terminal assemblies.

Lastly, the power block 25 has a further pair of electrical ports 35 associated therewith, which ports 35 are generally aligned and project transversely from opposite sides of the power block so as to project toward the opposite sides of the power block. The ports 35 cooperate with the flexible jumpers 18 which transfer electrical power between the powerways 17 of adjacent panels, and may herein be referred to as the transfer ports or terminal assemblies. The ports 35 are disposed adjacent the longitudinally outer end of the power block and are positioned closely adjacent the endwise facing port 32.

As to the plurality of conductive plates 31 which are supported within each power block, this plurality includes two separate groupings each containing six different conductive plates in the illustrated embodiment, with two additional plates being ground plates which are common or shared by both groupings, as explained below. These two groupings are positioned and configured so as to cooperate with only one side of the power block so as to permit access to electrical power from the designated side. The two groupings of conductive plates will, for convenience in reference, be referred to as the A and B groups, which groups respectively cooperate with the A and B sides of the power block as illustrated in FIGS. 3, 11, 12, 13, 16 and 17.

As to the grouping of plates associated with the A side of the power block, this grouping includes plates 41, 42, 43, 44, 45 and 46 which are all substantially identical. Each plate 44, 45 and 46 is designed to function as a "hot" or "live" conductor, whereas each plate 41, 42 and 43 functions as a "neutral" conductor. The plates 41 and 44 cooperate to define a first electrical circuit, the plates 42 and 45 cooperate to define a second electrical circuit, and the plates 43 and 46 cooperate to define a third electrical circuit.

The conductive plate 41 (as well as each of the plates 42–46) comprises an elongate bus 51 which extends longitudinally throughout substantially the length of the power block housing and has a generally Z-shaped cross section which includes a vertical plate part which at its upper end is joined to a sidewardly projecting horizontal plate part 52. The vertical plate part at its lower end joins to a further horizontal plate part 53 (FIG. 7) which projects sidewardly in the opposite direction from the top plate part 52. The bottom plate part 53 in turn has a plurality of contacts or terminals 54 projecting outwardly in generally coplanar relationship therewith, which contacts or terminals 54 project sidewardly toward only one side of the power block, namely the A side thereof. As illustrated by the conductive plate 41 in FIG. 7, each conductive plate 41 through 46 has four contacts 54 projecting sidewardly therefrom in longitudinally spaced relationship therealong, these four contacts being identified as 41-1 through 41-4 in FIG. 7. Each plate 41 through 46 also has a tab 41-5 located at the longitudinally inner end of the power block and provided with a crimp 55 thereon, the latter being mechanically coupled in a conventional manner to one end of a respective one of the conductive wires 27. The two terminals 41-1 and 41-2 as located closely adjacent the outer longitudinal end of the power block are separated by an intermediate slot 56, and in similar fashion the terminal 41-4 and tab 41-5 which are closely adjacent one another at the longitudinally inner end of the power block are also separated by a narrow slot 57. The remaining contact 41-3 projects sidewardly intermediate the ends of the bus 51.

The other grouping of the conductive plates 31, namely the group B which cooperates with the B side of the power block, also includes six conductive plates in the illustrated embodiment and specifically includes the six plates 61–66. Each plate 64, 65 and 66 functions as a "live" or "hot" plate, and each plate 61–63 functions as a "neutral" plate. The plates 61 and 64 cooperate to define a fourth electrical circuit, the plate 62 and 65 cooperate to define a fifth electrical circuit, and the plate 63 and 66 cooperate to define a sixth electrical circuit.

The conductive plate 61 (as well as each of the plate 62–66) is constructed generally similar to the plate 41 in that it includes a longitudinally elongated bus 67 which is of a generally Z-shaped cross section and includes a vertical plate part which at its lower end is joined to a sidewardly projecting horizontal plate part 68. The upper end of the vertical plate part in turn joins another horizontal plate part 69 (FIG. 7) which projects sidewardly in the opposite direction and defines thereon a plurality of horizontally sidewardly projecting contacts 70, there being four such contacts disposed in longitudinally spaced relationship along the respective bus 67, these contacts being designated 61-1 through 61-4. Plate 61 (as well as each plate 62–66) has a tab 61-5 at the longitudinally inner end of the bus, which tab has a crimp 71 fixed thereto, the latter being connected to one end of a respective conductor 27. The contacts 61-1 and 61-2 are disposed closely adjacent one another at the longitudinally outer end of the bus and are separated by a narrow slot 72 therebetween. Similarly contact 61-4 and tab 61-5 are disposed adjacent the longitudinally inner end of the bus and are separated by a narrow slot 73 therebetween. The remaining contact 61-3 as located intermediate the ends of the bus.

The remaining conductive plates 47 and 48 are substantially identical and both cooperate with each of the A and B groups. Plates 47 and 48 are ground conductors, with plate 47 being what is often referred to as the "common" ground, and plate 48 being an "isolated" ground.

As to the construction of the conductive plate 47 (as well as the plate 48 which is identical thereto), it comprises an elongate bus 75 which is a generally flat longitudinally extending plate part to which a plurality of terminals or contacts 76 are joined and which project horizontally towards opposite sides of the power block. Specifically, a set of four such contacts projects sidewardly from each side of the bus 75, namely a first contact 47-1A and 47-1B adjacent the longitudinally outer end of the power block, a second contact 47-2A and 47-2B disposed closely adjacent the respective contact 47-1A and 47-1B but separated therefrom by a narrow slot, a third contact 47-3A and 47-3B disposed intermediate the ends of the bus, and a fourth contact 47-4A and 47-4B located closely adjacent the inner longitudinal end of the bus. The contacts 47-1, 47-2 and 47-4 of these two sets are generally transversely aligned relative to the bus, while the remaining contacts 47-3 are longitudinally offset, as appearing in FIG. 7. The bus 75 also has a tab 47-5 at the longitudinally inner end thereof, the latter being provided with a crimp 77 to which one end of a respective conductive wire 27 is joined.

Considering now the construction of the hollow housing 29 for the power block, the housing is primarily defined by two side housing parts 81 and 82 (FIGS. 7–16) which are preferably constructed of an electrically insulative material, such as by being molded of a plastic material. The two side housing parts 81 and 82 cooperate to define an interior chamber 83 to accommodate therein the A and B groupings of conductive plate 31. The interior chamber 83 is defined generally between housing side walls 84 and 85 which are generally vertically parallel with one another, and top and bottom walls 86 and 87 which project generally horizontally from the side wall 85 for abutment against the other side wall 84. The walls 85–87 are part of the side housing part 81, which part also includes a plurality of divider walls 88 which project horizontally from the side wall 85 in generally parallel but spaced relationship between the top and bottom walls. Most of these divider walls 88 extend longitudinally throughout a majority of the length of the power block housing, and the plurality of divider walls 88 are themselves vertically spaced apart so that the divider walls 88 and their cooperation with the top and bottom walls 86 and 87 divide the interior of the power block housing into a plurality of separate chambers 89 which extend longitudinally of the housing but are disposed vertically one above the other.

Each of the three uppermost and three lowermost chambers 89 accommodates therein, in spaced relation, two of the conductive plates 31, one associated with each of the A and B groups. For example, the uppermost chamber 89 shown in FIG. 12 accommodates the conductive plates 41 and 61, and in similar fashion the lowermost chamber 89 accommodates the conductive plates 46 and 66.

The side housing part 81 also has a plurality of longitudinally elongate, parallel, and vertically spaced separator walls 91 projecting horizontally inwardly in cantilevered fashion from the side wall 85. One of these separator walls 91 projects inwardly a limited extent into each of the three uppermost and three lowermost chambers 89, with the separator wall 91 being spaced upwardly a small distance from the respectively adjacent divider wall 88 to define a narrow slot 92 therebetween, which slot effectively accommodates and confines the lower leg of the respective group B conductive plate (such as plate 61) associated with that compartment.

In similar fashion, the other housing part 82 also has a plurality of longitudinally elongated, parallel, and vertically spaced separator ribs 93 fixed thereto and projecting horizontally inwardly in cantilevered relation from the side wall 84. One of these separator ribs 93 projects inwardly into each of the three uppermost and three lowermost cavities 89, with the rib 93 projecting inwardly a limited distance at an elevation above the separator wall 91 associated with the same compartment. This separator rib 93 is also spaced downwardly a small distance from the respectively adjacent divider wall 88 (or the top wall 86) to define therebetween a narrow slot 94 which confines therein the top leg of the respective group A conductive plate, such as the top leg of the plate 41, associated with that compartment.

Figure 12:
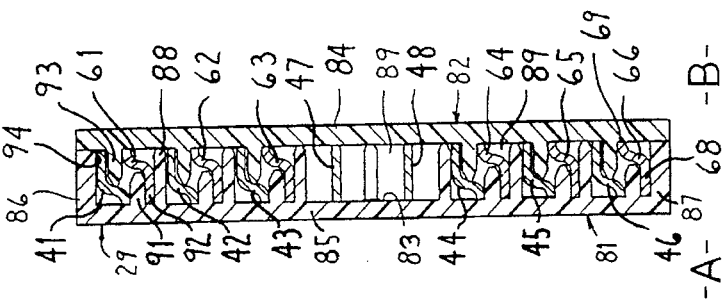
FIGS. 12 and 13 are enlarged sectional view taken respectively along lines 12—12 and 13—13 in FIG. 11.
Figure 13:
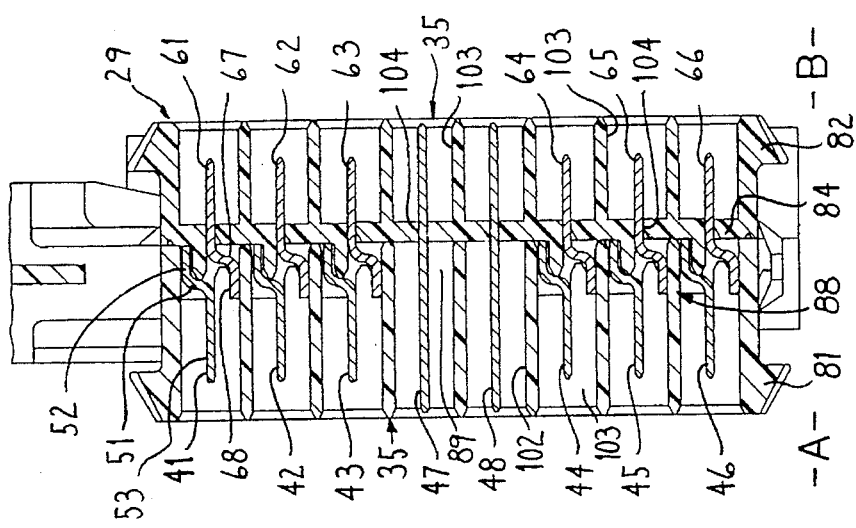

In addition, as illustrated in FIG. 12, the separator wall 91 and separator rib 93, which cooperate with a single cavity 89, cooperate so as to confine the two conductive plates of that cavity (such as the plates 41 and 61) in spaced relationship generally one above the other and at the same time maintain the conductive plates properly confined between the opposed side walls 84 and 85, whereby the longitudinally extending Z-shaped bus plates are thus vertically stacked in spaced relationship one above the other. However, the stacking is such that the contacts associated with the two plates project horizontally outwardly through the opposite side walls 84 and 85, with these contacts being horizontally coplanar as illustrated by FIG. 13.

Figure 14:
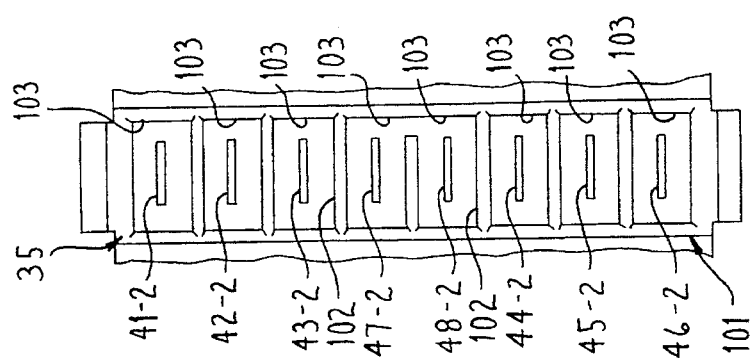

The housing part 81 has a tubular shroud 101 (FIGS. 13 and 14) projecting transversely outwardly relative to the respective side wall and defining a part of the respective port 35. This shroud 101 is of a vertically-elongated rectangular cross section and the interior thereof is horizontally bisected by a plurality of divider plates 102 which are disposed in uniformly vertically spaced relationship throughout the height of the shroud so as to divide the shroud into eight vertically stacked compartments 103. The divider plates are a part of and constitute sideward extensions associated with the respective divider walls 88, and likewise the respective compartments 103 within the shroud 101 associated with the housing part 81 open inwardly in full communication with the interior compartments 89 as shown in FIG. 13. Each of the compartments 103 accommodates therein one of the contacts associated with the respective port 35, these specifically being the contacts 41-2 through 48-2 as illustrated in FIG. 14, thereby defining the overall respective port 35 on the A side of the power block.

Figure 15:
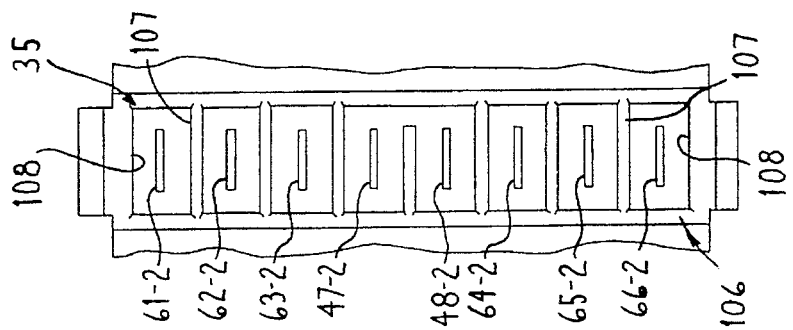
FIGS. 14 and 15 are fragmentary views which illustrate the terminals appearing on the left and right sides, respectively, of FIG. 13.

As to the other port 35 as associated with the B side of the power block, which port is defined on the housing part 82, it also is defined by a vertically-elongated rectangular shroud 106 (FIGS. 7 and 15) which projects horizontally outwardly from the side wall 84, with the interior of this shroud 106 being divided by a plurality of vertically spaced divider plates 107 into a plurality of compartments 108 which are vertically disposed one above the other, with these compartments 108 opening horizontally at their outer ends. The divider plates 107 are substantially horizontally coplanar with the divider walls 88 associated with the other housing part 81. While the inner ends of the compartments 108 are closed off by the side wall 84, nevertheless this side wall has a plurality of horizontally elongated slots 109 (FIG. 8) extending therethrough, which slots 109 are vertically spaced apart so that each slot communicates generally with the center of a respective one of the compartments 108, thereby permitting the individual compartments 108 to respectively communicate with a respective aligned interior chamber 89. The slots 109 enable the terminals 61-2 through 66-2, as well as the terminals 47-2 and 48-2, to project horizontally into the respective compartments 108 as illustrated by FIGS. 13 and 15.

With respect to the ports 33, 34 and 35 which project sidewardly from the housing part 81, each of the ports 33 and 34 is constructed substantially identical to the port 35 as described above, so that further detailed description thereof is believed unnecessary. However, it should be noted that the port 33 receives therein the terminals designated "–4" as associated with the conductive plates 41 through 48, whereas the port 34 receives the terminals designated "–3" associated with the same conductive plates 41–48. In addition, the side wall 85 has a row of vertically spaced slots 90 opening therethrough for accommodating the terminals associated with the port 34.

With respect to the three ports 33, 34 and 35 associated with the other housing part 82, the ports 33 and 34 again are substantially identical to the port 35 so that further detailed description thereof is believed unnecessary, except the port 33 receives the terminals designated "–4" and the port 34 receives the terminals designated "–3" as associated with the conductive plates 61–66 and 47–48.

Figure 16:
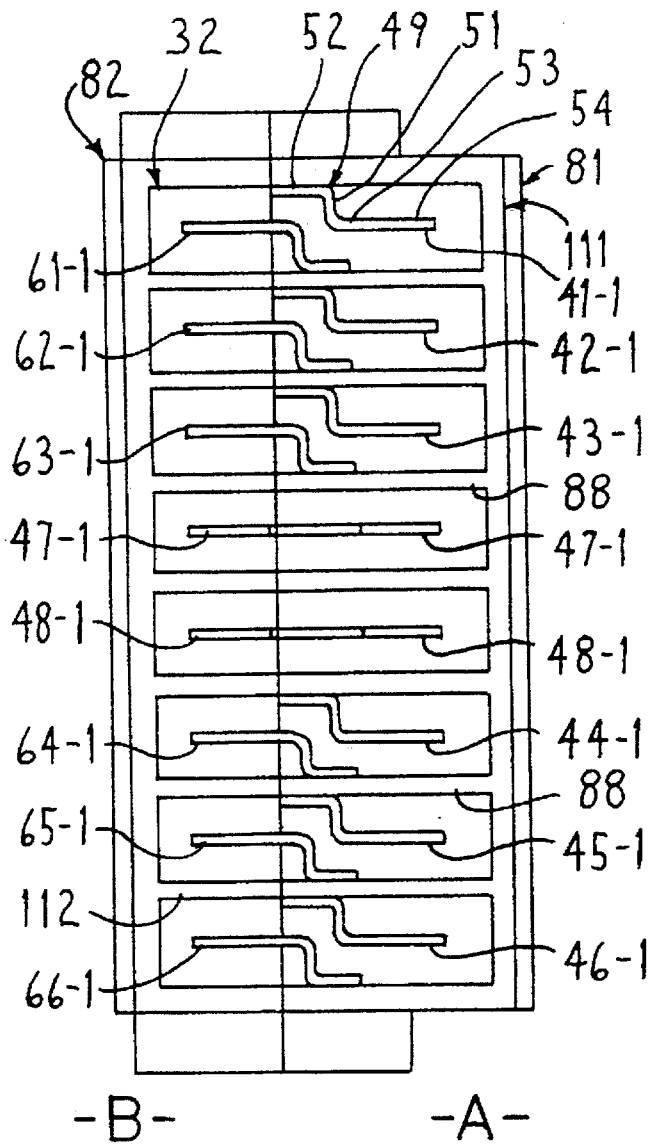
FIG. 16 is an enlarged elevational view showing the terminal appearing on the rightward end of the power block shown in FIG. 11.

With respect to the port 32 which is formed at the outer end of the housing and projects in the endwise direction, this is also defined by a generally tubular shroud which is of a vertically-elongated rectangular cross section and is defined by the cooperation of generally opposed U-shaped wall structures associated with the housing parts 81 and 82, as illustrated in FIG. 16. These cooperating housing parts have horizontal divider walls associated therewith, these being extensions of the dividers wall 88 associated with the housing part 81, as well as horizontally coplanar dividers walls 112 associated with the outer housing part 82, whereby these walls 88 and 112 cooperate to divide the shroud 111 into a plurality of vertically stacked compartments 113 which open endwise of the housing, there being eight such compartments. Each compartment 113 receives therein, along one side thereof, the terminals designated "–1" associated with one grouping of conductive plates, and similarly each compartment receives therein adjacent the other side thereof the terminals designated "–1" associated with the other grouping of conductive plates. The port 32, as shown in FIG. 16, defines two sidewardly-spaced, vertically-oriented rows of eight contacts, the eight contacts on the side of the housing part 81 being the contacts 41-1 through 48-1 as associated with one grouping of conductive plates, and the contacts 61-1 through 66-1 as well as 47-1 and 48-1 being associated with the other grouping of conductive plates.

The power block housing, at the inner end thereof, defines therein an enlarged interior chamber 116 for accommodating the connectors (such as the connectors 55, 71 and 77 shown in FIG. 7) which connect the plurality of conductive plates 31 to the plurality of conductive wires 27. The wires 27 project into this interior chamber 116 through an opening 117 defined at the upper inner end of the power block housing.

The housing part 81, adjacent opposite ends thereof, also includes a pair of vertically-extending support walls or ribs 118 and 119 (FIG. 10), the latter having a plurality of vertically spaced slots formed therein so as to supportingly accommodate the plurality of conductive plates in vertically but closely spaced relationship as illustrated by FIGS. 12 and 13.

Each of the power block housings also has a plurality of support posts 121 (FIG. 5) secured thereto and projecting upwardly therefrom. These posts engage the underside of an elongated support rail 122 (FIG. 4) which is hat shaped in cross section and extends longitudinally of the powerway 17 for permitting the two power blocks 25 and 26 to be secured thereto. Appropriate screws extend through the support rail 122 for engagement within the support posts 121. This support rail 122 also has a plurality of openings 123 formed therethrough, which openings cooperate with suitable fasteners, such as conventional quarter-turn locking cams which are carried on the bottom frame rail of the panel to permit the powerway to be fixedly but releasably secured to the panel.

Figure 17:
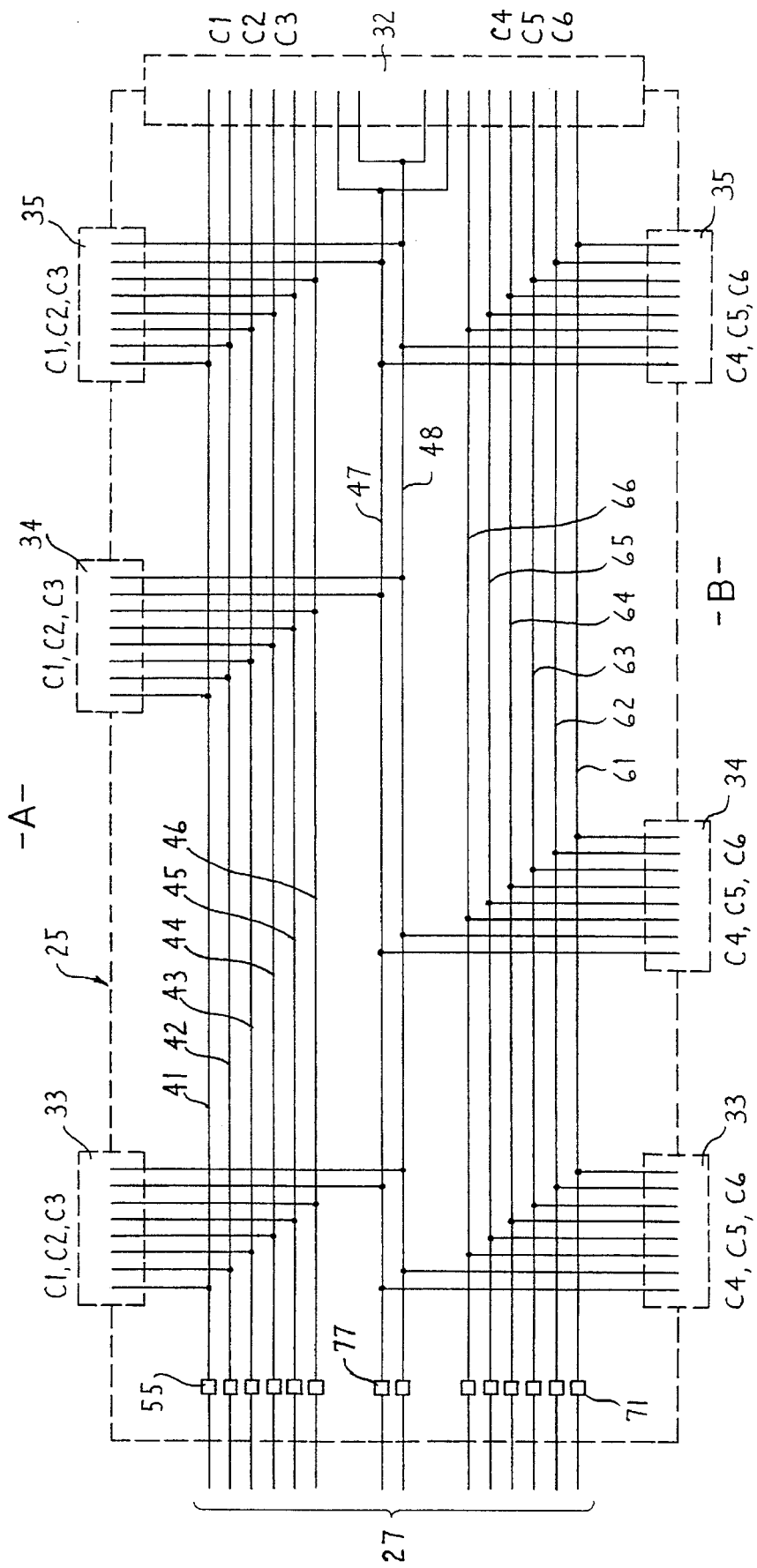
FIG. 17 is an electrical schematic of the power block.
Figure 18:
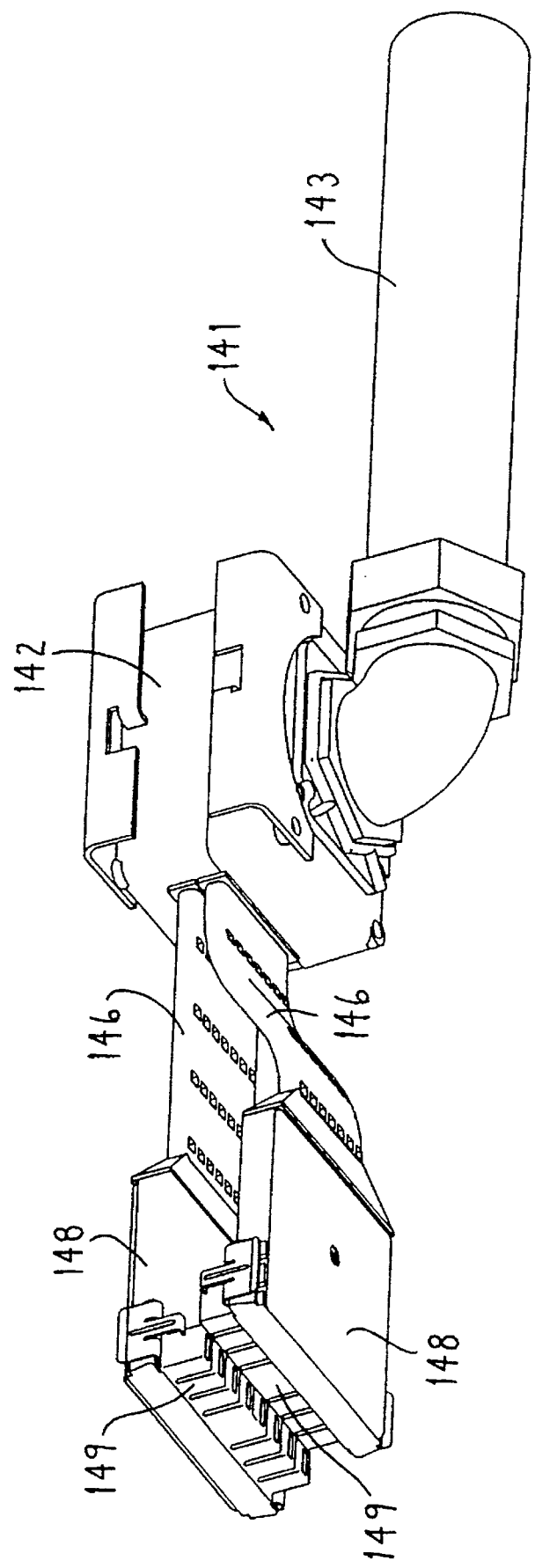
FIG. 18 is a perspective view of a base power feed assembly.
Figure 21:
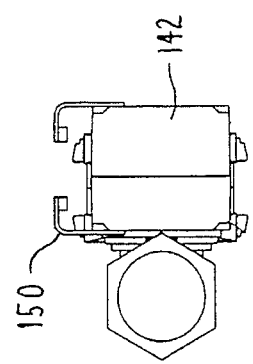
FIG. 21 is an right side elevational view of the assembly as shown in FIG. 20.
Figure 19:
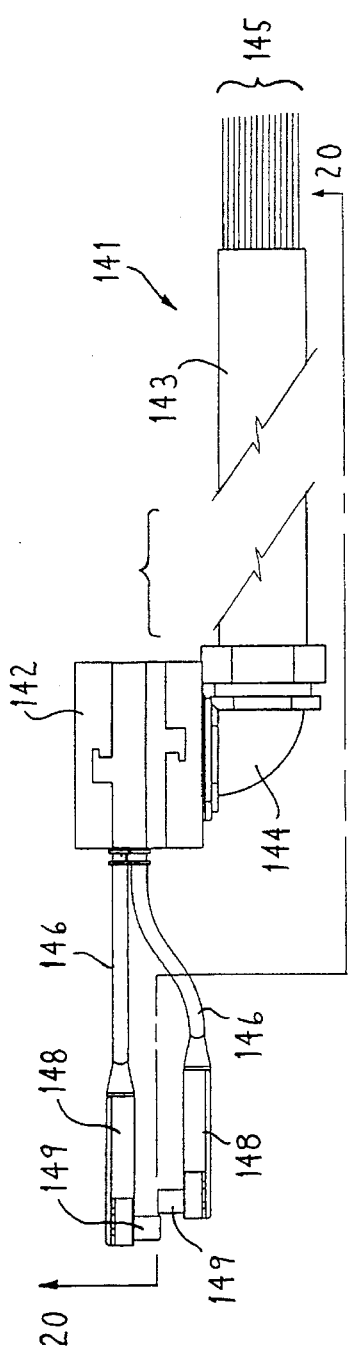
FIG. 19 is a plan view of the base feed assembly shown in FIG. 18.
Figure 20:
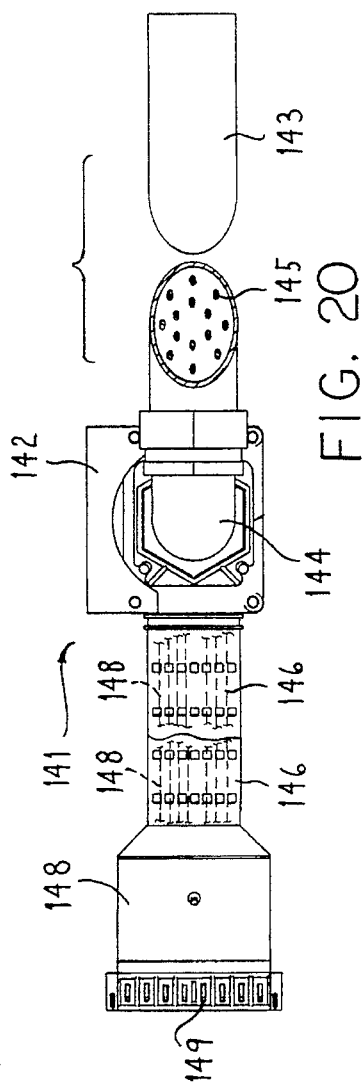
FIG. 20 is an elevational view taken generally along line 20—20 in FIG. 19.

With the construction and assembly of the power block 25 as described above, the conductive plates and their cooperation with the ports 32–35 provide electrical paths which are diagrammatically illustrated in FIG. 17. As indicated by this latter figure, the three ports 33, 34 and 35 as associated with the A side of the power block cooperate with the group of conductive plates 41–48 so that each of these ports provides access to three different circuits designated C1, C2 and C3. These same three circuits are also accessible by the one vertical row of contacts associated with the end port 32. As to the ports 33, 34 and 35 associated with the other side B of the power block, these access the other grouping of conductive plates, namely the conductive plates 47–48 and 61–66. Each of the ports 33, 34 and 35 on the other side of the power block also provide access to three electrical circuits, although in this case the three circuits are totally distinct from the three circuits accessible on the first side of the power block, these three distinct circuits being designated C4, C5 and C6. These latter three circuits are also accessible by means of the other vertical row of contacts as provided adjacent one side of the connector 32.

In the normal and preferred embodiment of the invention, the individual conductive wires 27 at one end thereof connect to the respective individual conductive plates associated with the power block 25 in the manner diagrammatically illustrated in FIG. 17. The other ends of these conductive wires 27, however, connect to the conductive plates associated with the other power block 26 in generally a reverse manner so that the circuits C1–C3 are accessible from the power blocks 25 and 26 from the same side of the panel, and the circuits C4, C5 and C6 are accessible from the power blocks 25 and 26 from the opposite side of the panel.

To electrically interconnect adjacent panels such as panels 12 and 13 in FIG. 1, the adjacent power blocks are electrically joined by the electrical jumpers 18 which are diagrammatically illustrated in FIG. 3.

The electrical jumper 18 as shown in FIGS. 27–29 includes a pair of rigid insulative housing parts 131 which are joined together by an intermediate flexible hinge portion 132, the latter being formed as a substantially flat but flexible strap which can be readily hinged in a horizontal plane so as to accommodate and permit the desired angular relationship between adjacent serially connected panels. A plurality, here eight, of electrical wires 134 extend through the hinge part 132 and terminate in a plurality, here eight, of electrical conductors as associated with each housing part 131, which conductors each include a pronglike conductive contact 135 (FIG. 29) which projects sidewardly of the housing. The eight contacts 135 are vertically spaced apart and are individually surrounded by substantially rectangular sleevelike shrouds 136 which are normally of a plastics material and formed integrally with the housing part 131. The contacts 135 and surrounding shrouds 136 define a plug-in connector portion 138 which can be plugged into the port 35 associated with the power blocks to electrically connect the eight-wire system from panel-to-panel.

The contacts 135 as associated with the connector portion 138 may be of any conventional configuration, and typically are a resilient forklike contact employing two blades which are spring-urged toward one another so as to provide for proper electrical contact with one of the contacts associated with the port 35 when the connector portion 138 is engaged with the port 35. Reference is made to U.S. Pat. No. 5,236,370, owned by the Assignee hereof, which illustrates the construction of such contact.

The electrical jumper 18 is normally provided in at least two lengths, with one primary length being suitable for connecting two adjacent panels when they are either directly aligned or in angled relationship with one another as indicated by the jumper 18 as diagrammatically shown in FIG. 3. However, if the jumper is to electrically join aligned panels which are somewhat spaced apart due to three panels defining a T-shaped configuration, then the intermediate strap 132 will be of greater length so that the jumper can span across the gap between adjacent panels, such as indicated at 18' in FIG. 3. To supply electrical energy to the electrical system 16, this is most frequently accomplished by connection to a power source or monument which is located either on the floor or on an adjacent wall. The electrical energy is supplied to the panel system from the monument by an assembly commonly know as a base feed assembly, such assembly being indicated at 141 in FIGS. 2 and 3.

The base feed assembly 141 of the present invention is shown in greater detail in FIGS. 18–21 and includes a blocklike housing 142 having a power-supply conduit 143 connector thereto through a suitable elbow connection 144. The housing or box 142 is intended to be positioned within the raceway between the side cover substantially as illustrated by FIGS. 2 and 3, and the housing is provided with suitable clips or fasteners, such as indicated at 150, to secure the housing to the support rail.

The power-supply conduit 143 has a plurality of electrical conductors (i.e., wires) 145 extending therealong, there being fourteen such wires in the illustrated embodiment. These wires at their remote ends are suitably connected to appropriate terminals associated with the power-supply monument. The wires then project into the box 142 for association with a pair of flexible straps 146 which project from the box 142 for connection to a power block.

Each flexible strap 146 contains therein a plurality of conductive wires 147 extending longitudinally therealong, which wires are generally overmolded by the plastic strap and at their inner ends connect to the respective power-supply conductors 145 which project into the box 142. The plurality of conductive wires 147 include at least three hot and three neutral wires so as to define three circuits, and at least one ground wire. In the illustrated embodiment, the plurality of wires 147 in each strap 146 is seven, with the seventh wire in one strap being the common ground, and the seventh wire in the other strap being the isolated ground. However, it will be apparent that the plurality of wires 147 in each strap can be eight since each strap can be provided with both the common and isolated grounds.

The strap 146 at its outer or free end is provided with a terminal block 148 which, on the inner side thereof, defines a connector or terminal assembly 149. This terminal assembly includes a plurality, here seven, of sidewardly projecting tubular shrouds each containing an electrical contact therein, which contact is connected to a respective one of the conductive wires 147. The terminal block is generally molded of a suitable insulative material, normally a plastic material. The contacts associated with each shroud of the terminal assembly 149 are also normally constructed in the same manner as the contacts associated with the flexible connector 18.

The terminal assembly 149 is designed to create a plug-type engagement with one of the ports 33 associated with the power block to supply electrical energy to the power block through the seven conductors associated with the respective flexible strap 146.

Since the block 142 has a pair of substantial identical flexible strap 146 formed thereon, which flexible straps each terminate in a terminal assembly 149 which is disposed substantially directly opposed to the terminal assembly on the other flexible strap, this enables the two flexible straps to be positioned so as to effectively straddle the power block, whereby the terminal assemblies 149 associated with the two flexible straps 146 plug into the opposed ports 33 defined on opposite sides of the power block, as illustrated in FIG. 3. Since the seven conductive wires 147 associated with each flexible strap include three distinct hot and three distinct neutral conductive wires which are all connected to different power-supply conductors 145, this enables six distinctly different electrical circuits to be supplied to the power block when both flexible straps 146 are plugged into the power block.

As a modification, instead of two flexible power straps 146 projecting outwardly in the same direction from one end of the box 142, alternately the two straps can project outwardly in opposite directions from the box 142 so that one strap will plug into a power block at one end of the panel, and the other strap will plug into a power block adjacent the other end of the panel.

Figure 23:
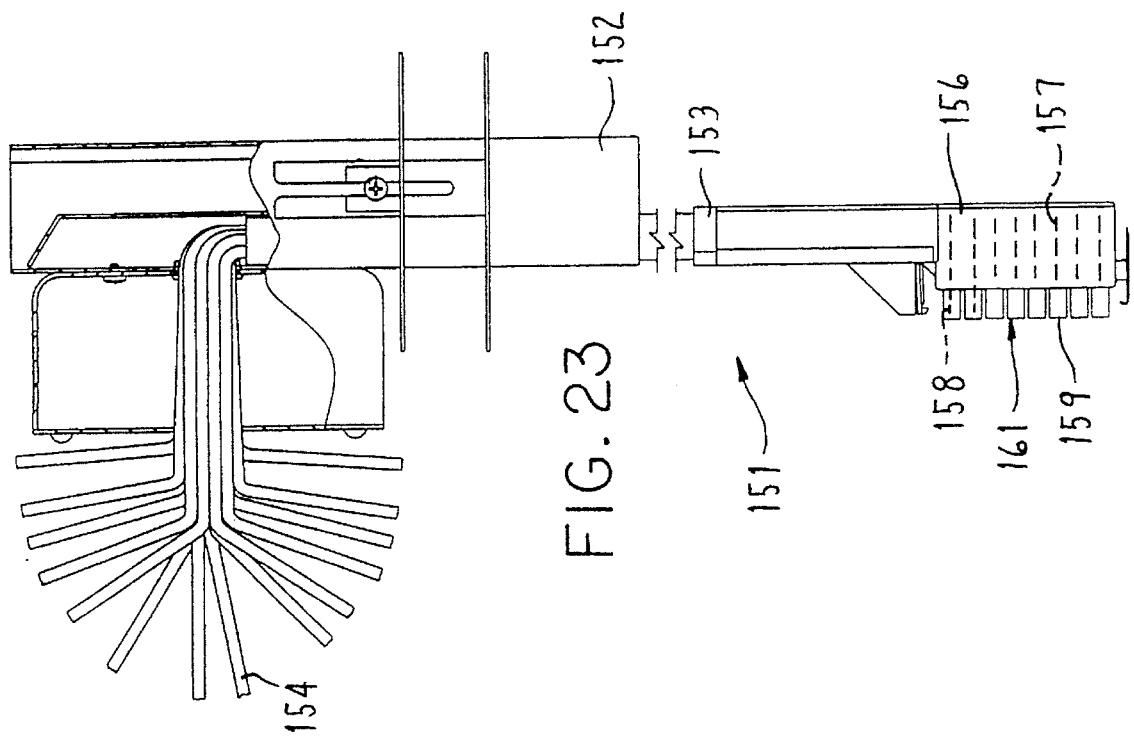
FIGS. 22 and 23 are end and side elevational view of a ceiling or top feed assembly.
Figure 22:
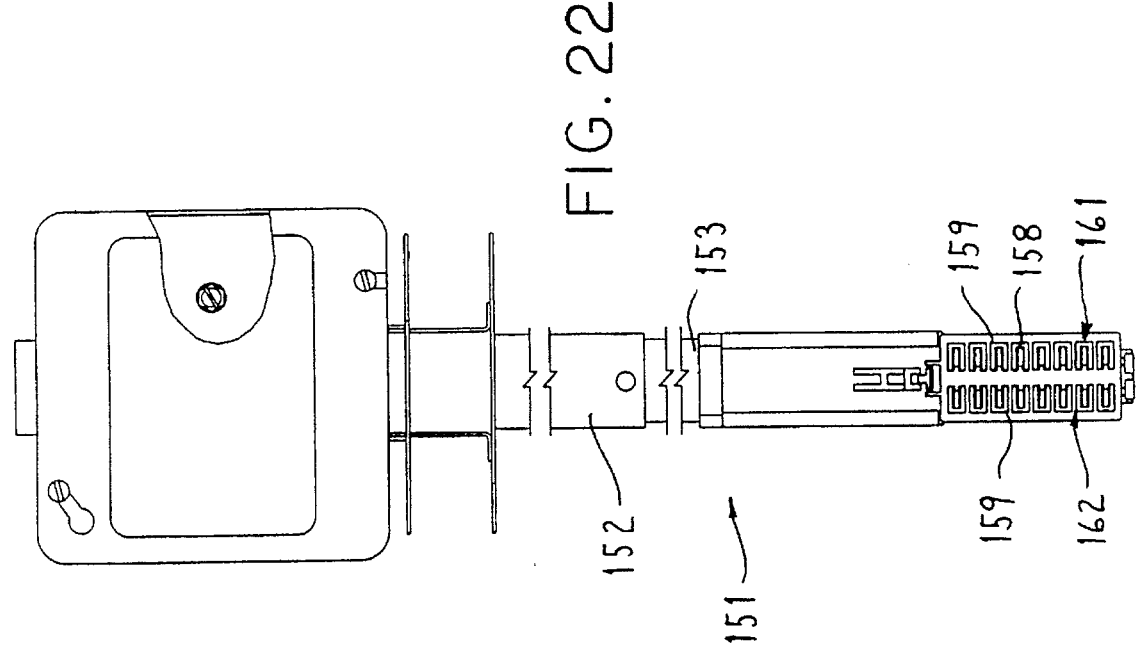

In those situations when electrical power is to be supplied from a power monument located in the ceiling, then a ceiling power feed assembly 151 (FIGS. 22 and 23) is utilized. This assembly includes a vertically-elongate tubular shroud 152 which is adapted to be slidably inserted through an interior channel defined vertically along one edge of the panel, with the shroud projecting upwardly into the vicinity of the ceiling. A raceway 153 extends interiorly of the shroud 152 and confines therein a plurality of conductive wires 154, i.e. fourteen wires in the illustrated embodiment. These wires 154 at their upper ends connect to the power source at the ceiling monument. The lower end of the raceway 153 projects downwardly from the shroud and joins to a connector housing 156 which contains therein a plurality of conductive members or plates 157 as indicated by dotted lines in FIG. 23. Each of these conductive plates 157 has the lower end of a respective one of the conductive wires 154 connected thereto. Each conductive plate has a contact 158 attached thereto, which contact projects outwardly of the housing and is surrounded by a generally U-shaped shroud 159 which is fixed to the housing. The contact 158 is normally a bifurcated or forklike contact, as generally described above. The shrouds 159 and respective contacts 158 are disposed in two sidewardly-adjacent vertically-oriented rows each containing eight contacts as illustrated by FIGS. 22 and 23, with each of the vertical rows having a common contact for the isolated ground and a common contact for the common ground. The other six contacts associated with each vertical row respectively connect to three distinct hot and neutral conductive wires so that connectors or terminal assemblies 161 and 162, as defined by the two rows, each represent three distinct electrical circuits.

With the shroud 152 and raceway 153 inserted into and projecting downwardly through a channel adjacent the vertical edge of the panel, this results in the terminal block 156 being disposed adjacent the end of the respectively adjacent power block 25 or 26. This hence enables the terminal assemblies 161 and 162 to be plugged into the end port 32 on the power block so as to supply six-circuit electrical power thereto.

Figure 24:
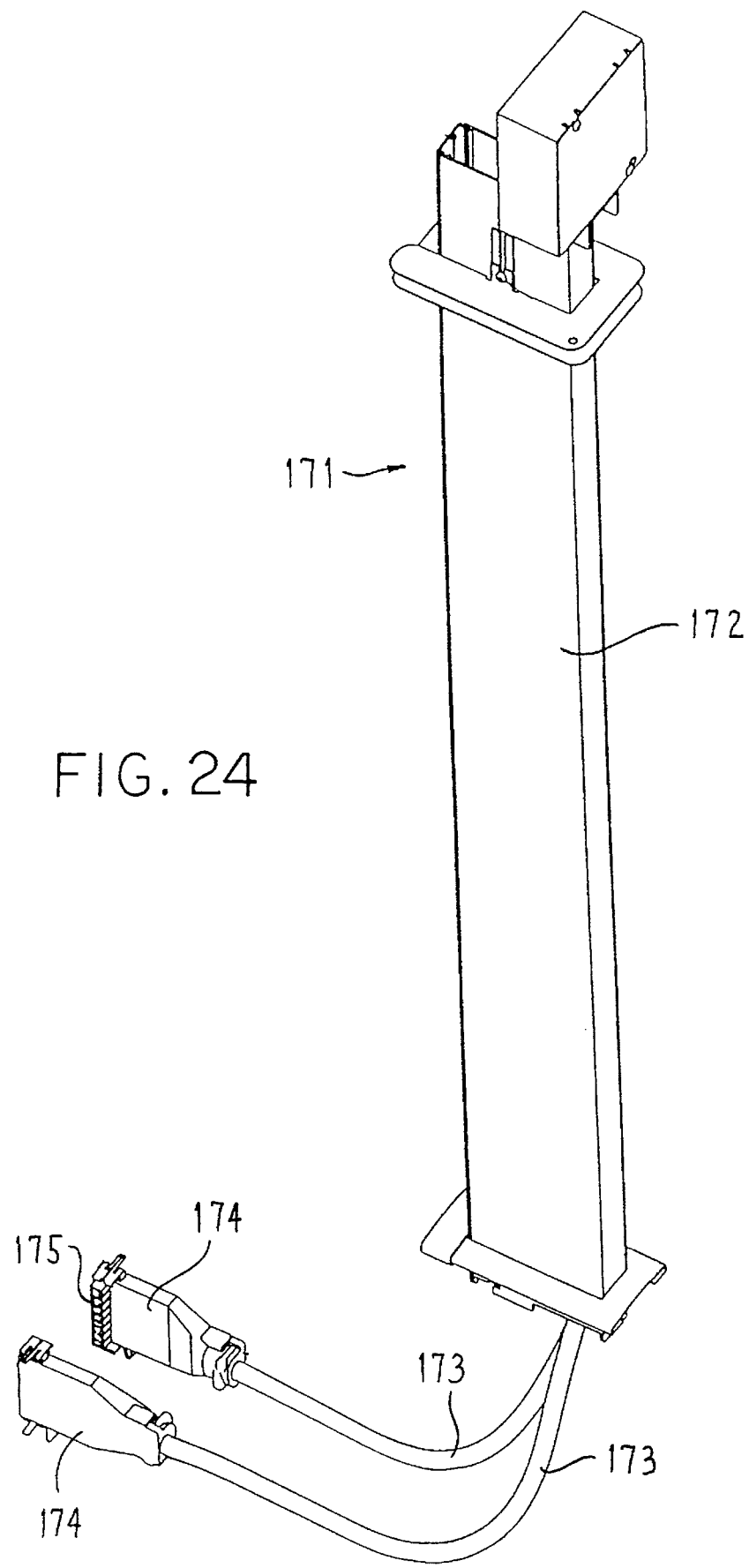
FIG. 24 is a perspective view showing an alternate form of the top feed assembly.

An alternative ceiling power feed assembly 171 is illustrated in FIG. 24. This assembly again connects to a ceiling-positioned electrical monument and has a tubular shroud 172 which projects downwardly through the interior of the panel and confines therein an electrical conduit which, at least at the lower end, is separated into two conduits 173 each containing at least seven electrically conductive wires, namely three neutrals, three hots, and at least one ground. The hots and neutrals associated with each conduit 173 are distinct so that the two conduits 173 supply six distinct electrical circuits. Each conduit 173 includes an elongate flexible portion which is adapted to extend along the bottom raceway of the panel, and the conduit terminates in a connector housing 174 which defines thereon a sidewardly projecting connector portion or terminal 175. The connector housing 174 and the related terminal 175 is substantially identical to the end terminals associated with the base feed assembly. The two conduits 173 can be disposed to extend along the raceway so that the two connector housing 174 are disposed so as to straddle the power block adjacent the remote end of the raceway, with the terminals or connectors 175 being plugged into the ports 33 disposed adjacent the inner end of the power block. To permit external electrical devices to access the electrical circuits available at the power blocks, each power block 25 or 26 permits an output unit or assembly 81 (FIG. 3) to be plugged into each side of the power block, which output assembly plugs into the sidewardly-facing ports 34. The output assembly 181, as illustrated by FIGS. 25 and 26, comprises a receptacle unit which, when mounted on the power block, is accessible through a small window or cutout 182 (FIG. 1) which is formed in the side cover. The receptacle unit is defined by a generally boxlike housing 183 which, on the front face, is typically provided with one, two or three conventional three-hole electrical sockets 184 so as to accommodate a conventional two or three prong 110-volt plug. The three-hole socket 184 cooperates with suitable electrical conductors which are disposed interiorly of the housing 183, which conductors in turn cooperate with a terminal assembly 185 which projects rearwardly from the rear side of the housing for creating a plug-type engagement with the port 34.

The terminal assembly 185 includes a pair of rearwardly projecting tubular shrouds 186 and 187 which contain therein the respective hot and neutral contacts, with these shrouds 186 and 187 being joined together for slidable movement along a housing slot 190, whereby the shrouds 186 and 187 can be disposed in three vertically spaced positions which correspond to three different circuits available at the connector 34. The remaining shrouds 188 and 189 are fixed to the housing and the shroud 188 is designed to contain a common ground contact, and the shroud 189 is designed to contain an isolated ground contact, with only a selected one of these ground contacts being provided.

The overall construction of the receptacle unit is explained in detail in U.S. Pat. No. 4,781,609, owned by the Assignee hereof, so that further detailed description thereof is believed unnecessary. The basic difference between the receptacle unit 181, and the receptacle unit disclosed in the '609 patent, is that the receptacle in the '609 patent possesses only a single ground and shroud, rather than two shrouds 188 and 189 which permit selection between use of either a common or an isolated ground. Further, the receptacle unit 181 is well known inasmuch as this unit is a commercially available unit sold by the Assignee hereof as part of its Power Base system.

While the receptacle unit 181 described above is of the switchable type so as to permit a single receptacle unit to access all three circuits which are available on one side of the power block, it will be appreciated that numerous other types of receptacle units can be utilized for this purpose. For example, while less desirable, nevertheless three different receptacle units can be provided each dedicated for connection to only a predetermined one of the different circuits associated with the power block, such dedicated receptacle units being conventional and well known.

The use and operation of the improved electrical system 16 of this invention will be briefly described below, and in this respect reference will be made to the diagrammatic illustration in FIG. 30.

The improved electrical system 16 of this invention is particularly desirable for supplying a large number of distinct electrical circuits (six in the illustrated embodiment) along a series of panels (i.e. a spine) which cooperate with branch panels to define a plurality of workstations. As indicated in FIG. 30, the series of panels designated 12A–12E are disposed in generally aligned relationship to define a spine, with additional panels designed 201 through 204 branching off from the spine panels substantially at right angle thereto so as to define workstations, two such workstations being indicated at 206 and 207. The series of main panels 12A–12E effectively function as a spine for both supportive engagement with the branch panels 201–204, and for supplying electrical energy from the spine or main panels to the branch panels.

The spine panels 12A–12E, in the illustrated embodiment, each have a prewired modular powerway 17 mounted thereon which positions the respective power blocks 25 and 26 adjacent the opposite vertical end edges of the respective panel. This modular powerway, and the respective power blocks 25 and 26, are constructed as described above and provide six electrical circuits extending longitudinally along the panel, with three circuits being accessible on the A side of each power block and three circuits being accessible on the B side of each power block. With the powerway 17 and the power blocks thereof wired as described above, the side A of power block 25 and the side B of power block 26, both on the side of the spine designated side I, provide access to the same three circuits, such as circuits C1, C2 and C3 as depicted in FIG. 30. Similarly, as to this same panel 12a, the B side of power block 25 and the A side of power block 26 both provide access to the other three circuits, namely the circuits C4, C5 and C6, on the side II of the spine.

Figure 30:
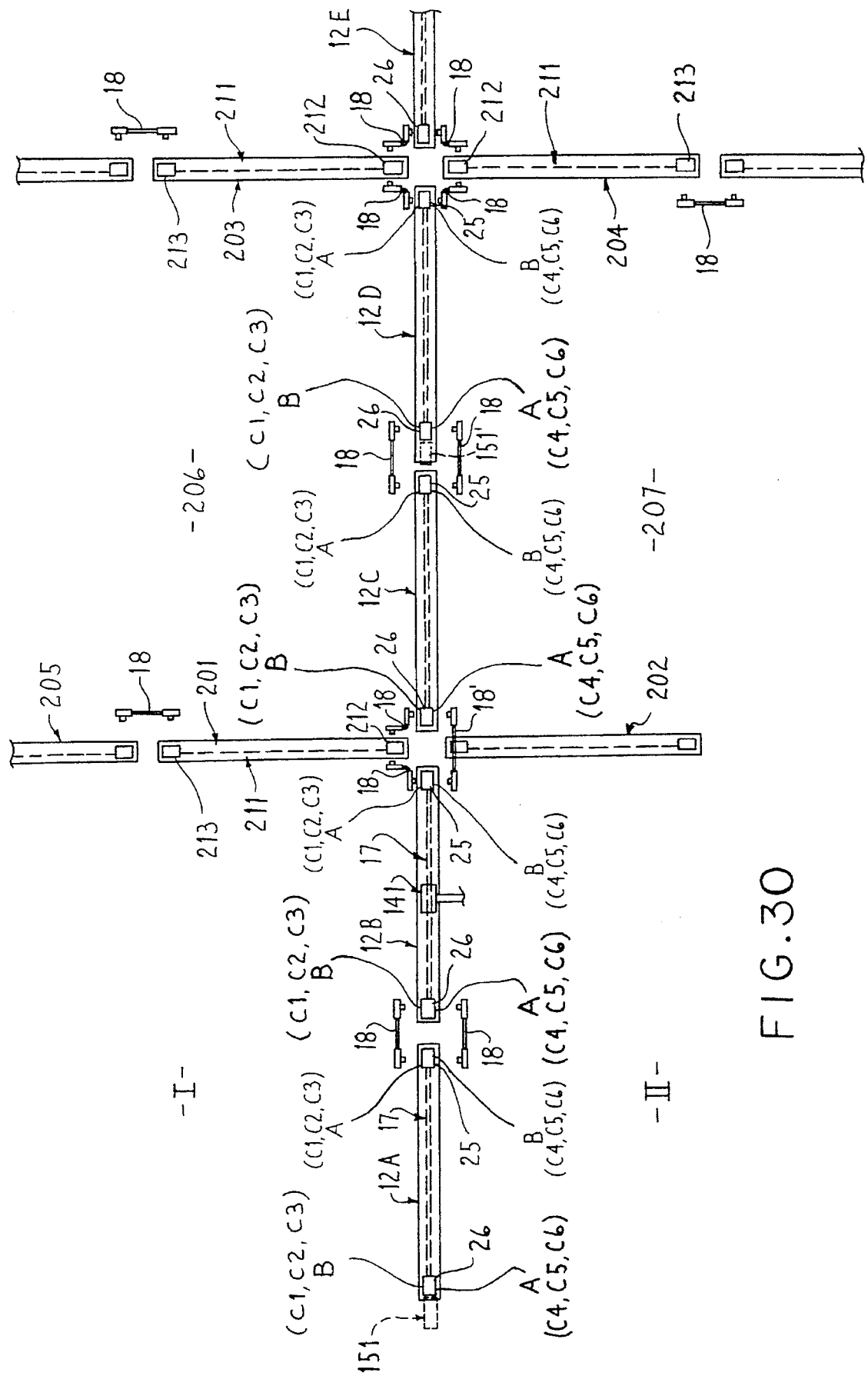
FIGS. 30 and 31 are diagrammatic illustrations of plan views showing arrangements of panels to define workstations, and particularly illustrating different applications of the electrical system according to the present invention.

Power is typically supplied to the spine through the base feed 141 as diagrammatically depicted in FIG. 30, which base feed can be connected to any one of the spine panels 12A–12E.

To transmit the plurality of electrical circuits between adjacent serially arranged panels in the spine, such as the panels 12A and 12B, two identical flexible jumpers 18 are utilized for transmitting the circuits between the power blocks of adjacent panels. For example, the two flexible jumpers 18 are disposed adjacent opposite sides of the power blocks, such as the power block 26 on the panel 12B and the power block 25 on the panel 12A, with these flexible jumpers being plugged into the transfer ports 35 associated with the power blocks. The flexible jumper 18 on the side I effects transfer of the three circuits C1, C2 and C3 between the adjacent panels, and in a similar fashion the flexible jumper 18 on the side II effects transfer of the circuit C4, C5 and C6 between the two panels.

When the main or spine panels cooperate with branch panels to form a T or cross connection, such as the cross connection defined with the branch panels 201 and 202, then the manner of electrical connection between the panels is a function of whether the branch panels are electrically powered or not. For example, if the branch panel is not electrically powered such as depicted by the panel 202, then the flexible jumper is utilized to extend and plug directly into the power blocks 25 and 26 of spine adjacent panels 12B and 12C, such as depicted by the jumper 18'. This latter jumper will normally be of greater length so as to permit spanning the greater gap between adjacent panels, but is otherwise identical to the jumper 18 and permits the transmission of the circuits C4, C5 and C6 between the panels 12B and 12C.

Figure 33:
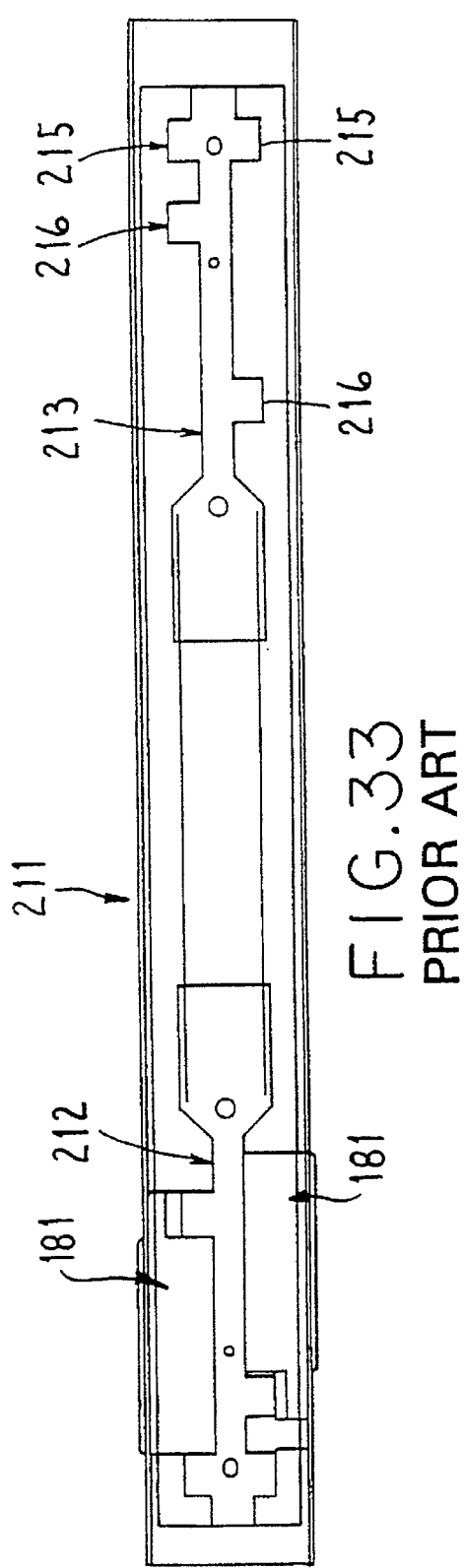
FIG. 33 is a plan view of the arrangement of FIG. 32.
Figure 32:
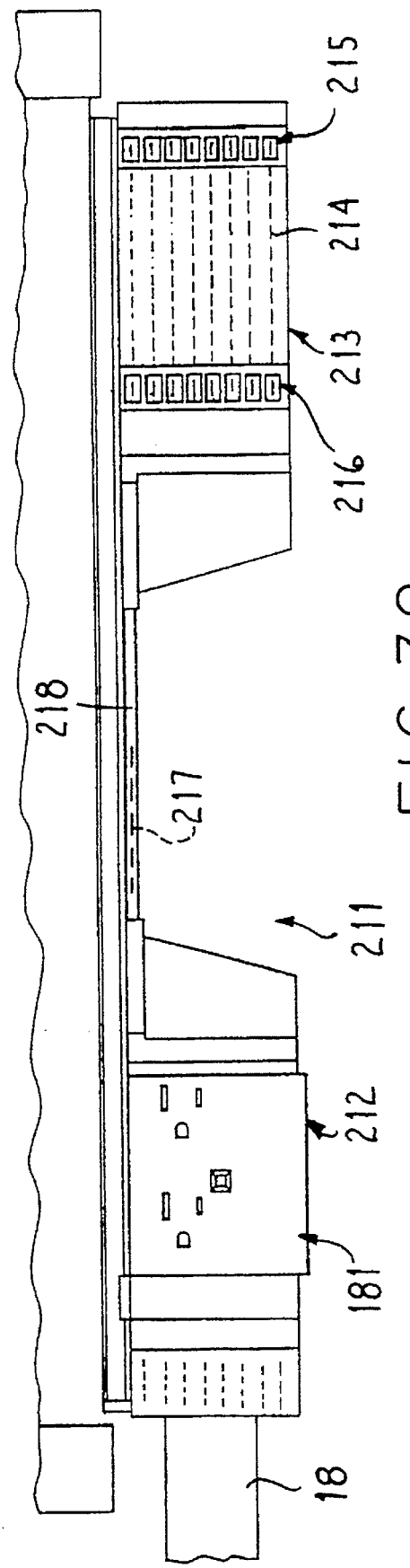
FIG. 32 is a fragmentary side view showing a known Power Base powerway mounted on a panel.

On the other hand, the branch panel can be electrically powered, as depicted by the branch panel 201. This panel has a prewired powerway 211 thereon, which terminates in power blocks 212 and 213. This powerway 211 is shown in FIGS. 32 and 33, and the power blocks 212 and 213 are substantially identical and each includes a series of conductors 214 positioned interiorly thereof, there being eight such conductors in the illustrated and preferred embodiment, three of the conductors 214 being live or hot conductors, three being neutrals, and two being grounds. These eight conductors have shrouded terminals accessible from opposite sides of the power block so as to define a first pair of ports 215 which project outwardly from opposite sides of the power block, as well as a further pair of ports 216 which also project outwardly from opposite sides of the power block. The ports 215 are identical to the ports 35 described above and create an electrical plug-in connection with one end of a flexible jumper 18. The other ports 216 are identical to the ports 34 described above and permit the receptacle unit 181 to be plugged thereto so as to provide access to any one of the three circuits which are defined by the conductors 214. These conductors 214 are individually connected to conductive wires 217, there again being eight such wires in the illustrated embodiment, which wires extend through the raceway 218 for connection to the other power block so that both power blocks have the same circuit capability, namely the same three circuits in the illustrated embodiment, with these same three circuits being accessible from both sides of the power blocks 212 and 213 and transferable from both sides of the power block from the panel 201 to a like panel such as panel 205.

The powerway 211 and its cooperation with the flexible jumper 18 for transmitting electrical energy from panel to panel is identical to the powerway arrangement and components therefor as described in U.S. Pat. No. 4,781,609, owned by the Assignee hereof, except that the arrangement of the '609 patent discloses only a single ground (i.e, a seven conductor system) rather than a double ground. Further, this powerway 211 and the flexible jumper utilized therewith are well known, and are commercially sold by the Assignee hereof under "The Power Base" trademark.

To transmit electrical power from the spine panel to the branch panel 201, the flexible jumper 18 is utilized for connection between power blocks associated with the spine panel 12B and the branch panel 201. This flexible jumper 18 at one end is plugged into the transfer port 35 provided on the A side of the power block 25. The other end of this jumper 18 is plugged into the adjacent side ports 215 provided on the power block 212 of the panel 201. This provides for transfer of the three circuits C1, C2 and C3 into the powerway 211 associated with the branch panel 201, which three circuits can then be transmitted to other panels along this branch, such as panel 205.

To continue the transfer of all six circuits along the spine, a further jumper 18 has one end thereof plugged into the port 216 provided on the other side of the power block 212 associated with the panel 201, and this jumper 18 at its other end plugs into the port 35 associated with the side B of power block 26 on panel 12C. This permits the three circuits C1, C2 and C3 as available at the power block 212 to be transmitted to the power block 26 of panel 12C, which power block again has all six circuits provided thereto, which six circuits are then transmitted downstream of the spine panels.

If two branches are to be powered from a T or cross, such as the branch panels 203 and 204, then two separate jumpers 18 are plugged into opposite sides of the power block, such as the power block 25 on panel 12B. The jumper 18 joined to the side B of power block 25 plugs into the power block 212 on branch panel 204, thereby transferring circuits C4, C5 and C6 to the branch panel 204. The other jumper 18 which is connected to the side A of power block 25 plugs into the power block 212 on branch panel 203, thereby transferring circuits C1, C2 and C3 to the branch panel 203. Each of the branch panels 203 and 204 are provided with three circuits of electrical power, except that the three circuits accessible from the branch panel 204 are distinct and different from the three circuits accessible from the branch panel 203, and vice versa, thereby providing for increased selectivity of circuits and distribution of loads on circuits, and at the same time enables a larger number of workstations to be electrically powered from a single electrical input source, such as from a single base feed 141.

The electrical energy can continue to be transmitted along this spine beyond the branch panels 203 and 204, if desired, merely by connecting two additional jumpers into opposite sides of the power block 26 on the panel 12E, with the other ends of these jumpers 18 being connected to the ports 216 provided on opposite sides of the power blocks 212 associated with the branch panels 203 and 204.

With the arrangement as described above, and such as illustrated in FIG. 30, the improved electrical system 16 of this invention can be utilized within the panels which define the spine or main run of a system, and the conventional "Power Base" system (i.e., the power modules 211) can be provided on the branch panels, thereby enabling the workstations to access a plurality of circuits, with different workstations accessing different pluralities of circuits. This also enables the powerways 211 associated with the conventional "Power Base" system to be utilized along the panel branches, with the improved powerway 17 of this invention being used along the main or spine panels, whereby the electrical system associated with the branches is of increased simplicity and is thus more economical to purchase and utilize as part of the overall system. Further, this also enables users to utilize existing panels bearing the "Power Base" system thereon, which existing panels can be utilized in conjunction with the improved powerway 17 of this invention by utilizing the powerway 17 on the panels defining the main spine or branch. At the same time, the receptacle units 181 and flexible jumpers 18 associated with the conventional "Power Base" system are still useable on the branches, and are also useable with the panels defining the spine, since the conventional receptacle units mount on the power blocks of the powerway 17, and the conventional jumpers 18 are useable for connecting the power blocks of two powerways 17, or for connecting the power block on a powerway 17 with the power block of a conventional powerway 211.

Figure 31:
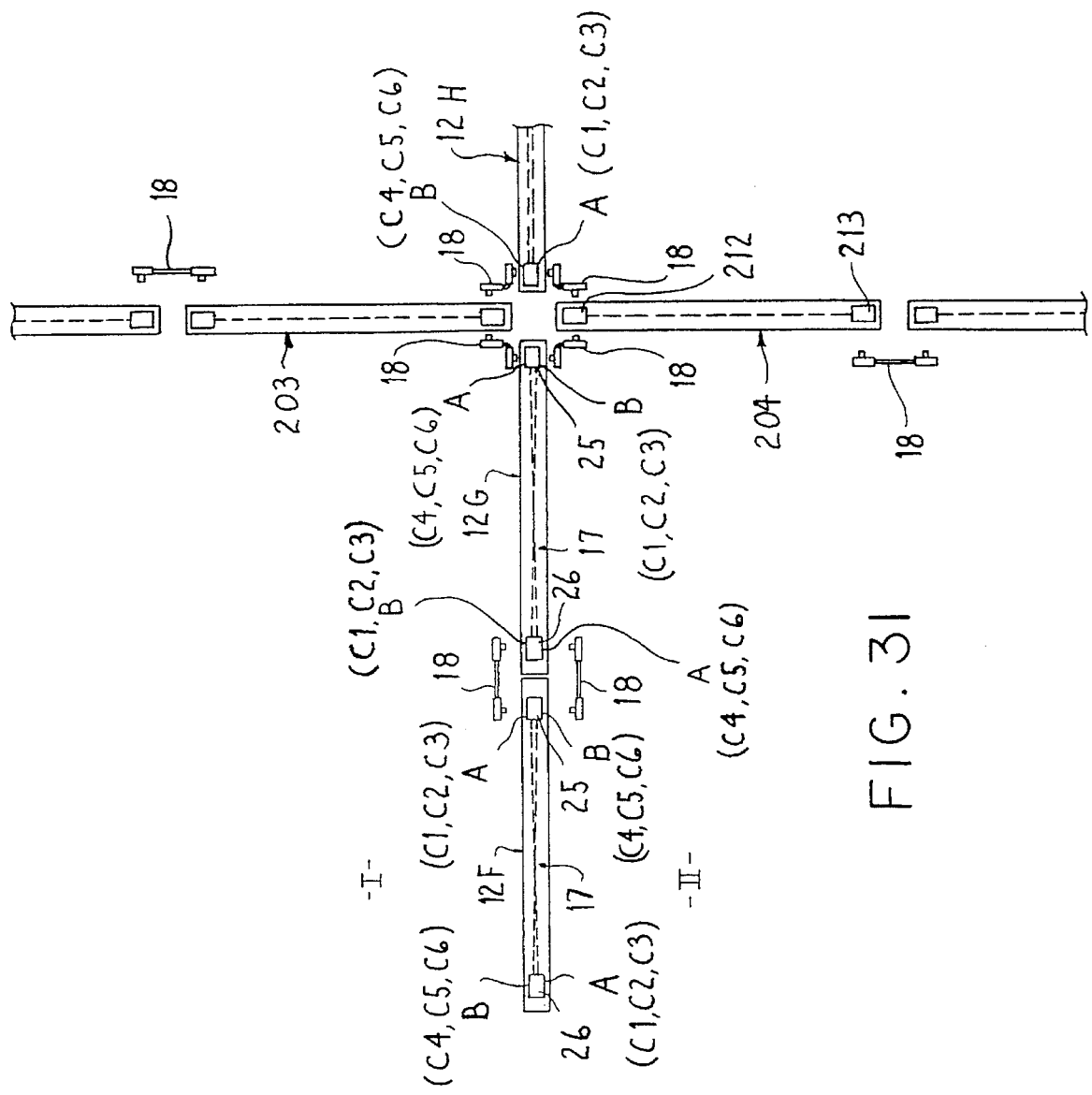

FIG. 31 illustrates a variation which can be incorporated into the modular powerway 17 of the present invention. In this variation, the two groupings of conductive wires which connect the two power blocks 25 and 26 are not maintained on opposite sides of the panel as in the arrangement described above, but rather are effectively crossed as they project longitudinally between the two power blocks 25 and 26 associated with the modular powerway 17. This results in the ports accessible from the A side of power block 26 on panel 12F being connected to three circuits such as circuits C1, C2 and C3, and similarly the ports on the A side of the power block 25 of panel 12F are also connected to the same three circuits, namely C1, C2 and C3. In similar fashion, the ports provided on the B side of the power blocks 25 and 26 on panel 12F are all connected to the other grouping of three circuits, namely the circuits C4, C5 and C6. This thus results in side I and side II of the panel 12F accessing all six circuits. For example, on the side I, the power block 25 accesses circuits C1 through C3, and the power block 26 accesses circuits C4 through C6. On the opposite side II, the power block 25 accesses circuits C4 through C6, and the power block 26 accesses circuits C1 through C3. This criss-cross relationship may continue between the power blocks of respective panels as the panels are serially connected together as depicted in FIG. 31. This thus enables all six circuits to be readily and conveniently accessible on both sides of the panels defining the main branch or spine.

In addition, as also shown in FIG. 31, the panels mounting thereon the modular powerway 17 of this invention can also be connected to branch panel runs which utilize the conventional "Power Base" system therein, such as depicted by the panels 203 and 204, which branch panels permit a smaller plurality of circuits to extend therealong, such as the circuits C1, C2 and C3 along the panel 204, and the circuits C4, C5 and C6 along the panel 203.

Three or more electrified panels mounting thereon the multiple-circuit modular powerway 17 of this invention can also be connected in a T or cross-shaped configuration so as to permit electrical power from a single branch of panels to be supplied to two or more branches of panels. Such connection involving a T or three-panel connection is illustrated by FIGS. 34 and 35.

Figure 34:
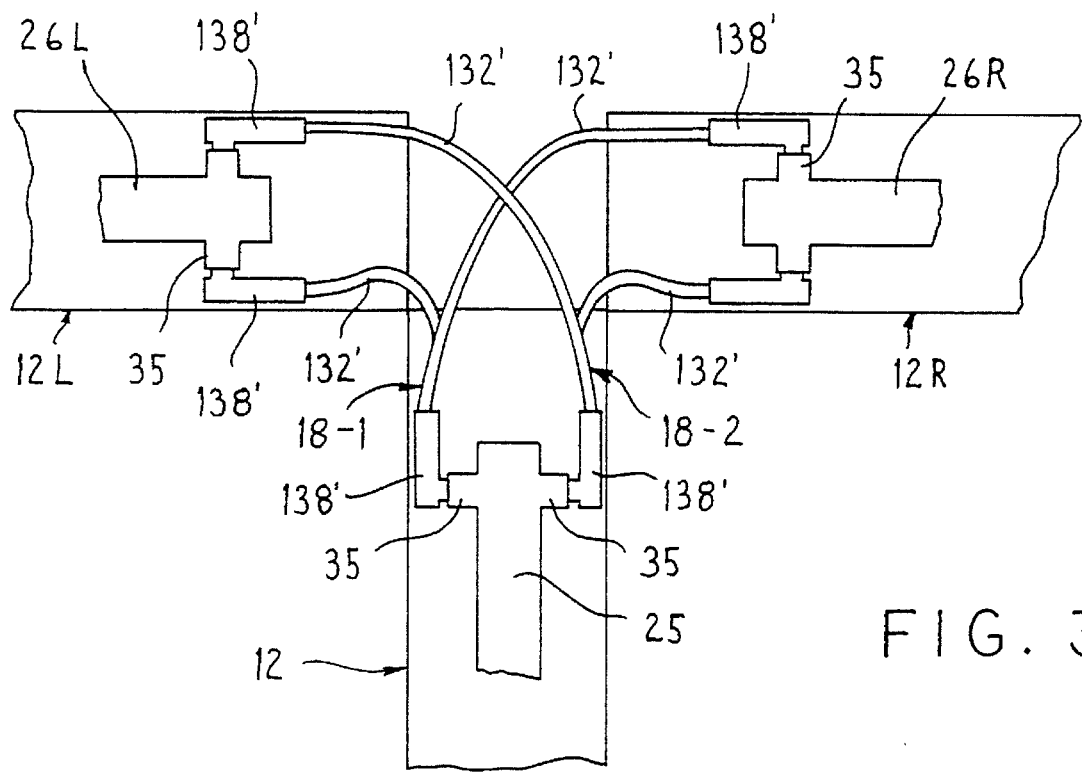
FIG. 34 diagrammatically illustrates a variation of the invention whereby three powered panels in a T connection are electrically connected.

As shown initially in FIG. 34, three panels 12, 12L and 12R have adjacent edges disposed to form a three-panel connection, commonly known as a T connection. Each of these three panels is provided with the modular powerway 17 of this invention thereon, but only the power block 25 on panel 12 and power blocks 26L and 26R on the respective panels 12L and 12R are shown in the drawings for simplicity in illustration. To permit the transfer of electrical power from one of these three panels to the remaining two panels, two flexible electrical jumpers designated 18-1 and 18-2 are utilized. The jumper 18-1 has a connector portion 138' at one end thereof which plugs into one port 35 of power block 25 for connection to the three circuits available at this port. This jumper 18-1 is provided with two flexible straps 132' which project from this connector 138', and each of these straps 132' have at least the same seven conductive wires extending therethrough for transmitting the same three circuits, and each strap 132' terminates in a similar connector 138' at the other end, one of which connects to one of the ports 35 on the power block 26L, and the other of which connects to one of the ports 35 on the other power block 26R. The other flexible electrical jumper 18-2 is constructed similar to the jumper 18-1 in that it also has a connector 138' on one end thereof which connects to the other port 35 associated with the power block 25, and two flexible straps 132' project outwardly therefrom and have connectors 138' at the other ends thereof which individually join to the remaining ports 35 associated with the power blocks 26L and 26R as shown in FIG. 34. With the arrangement illustrated in FIG. 34, the one jumper 18-1 is capable of transmitting three of the circuits between the three connected panels, and the other jumper 18-2 is capable of transmitting the remaining three circuits between the three connected panels.

Figure 35:
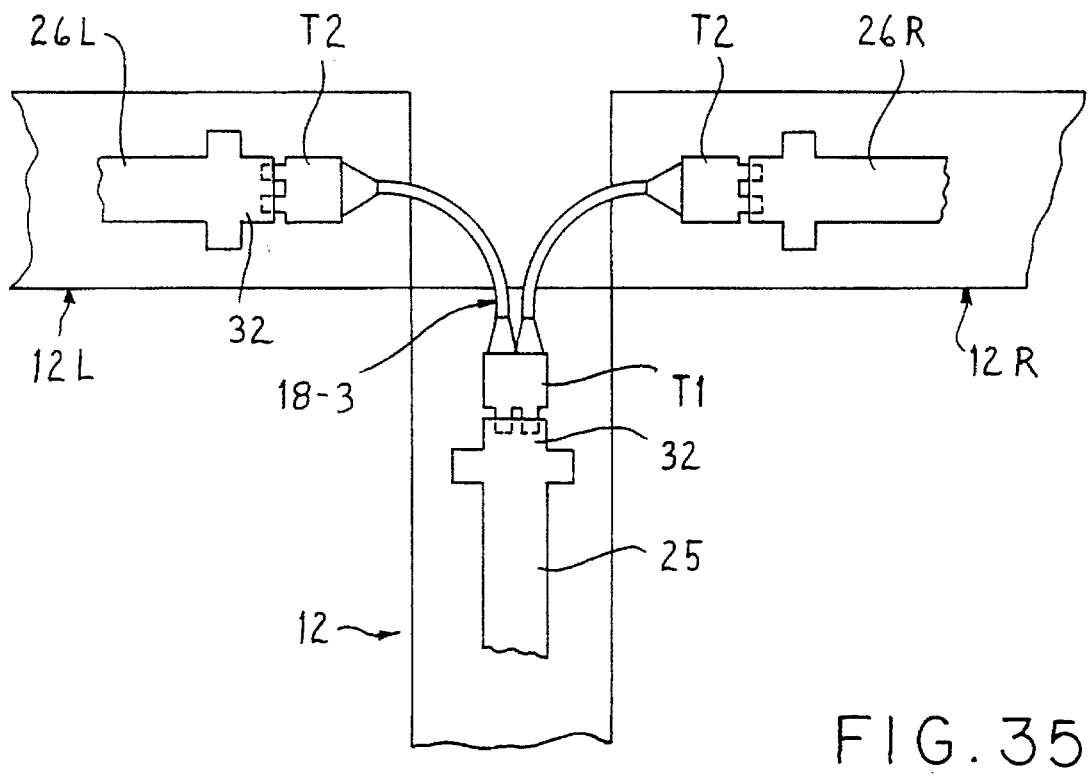
FIG. 35 is a view similar to FIG. 34 but illustrating a variation thereof.

In FIG. 35, there is depicted a similar T connection between three panels which each again mount the modular powerway of this invention thereon, such being depicted solely by the power blocks 25, 26L and 26R associated with the respective panels. In this variation, a flexible electrical connector or jumper 18-3 is provided for connecting the three power blocks provided on the adjacent edges of the three connected panels. This jumper 18-3 includes a terminal or connector portion T1 at one end which, in this variation, plugs into the port 32 associated with the end of the power block 25, whereby this connector T1 electrically accesses or connects to all of the circuits associated with the power block. The jumper 18-3 has two flexible straps projecting outwardly from the connector T1, and each of these straps transmits therethrough a plurality of conductive wires suitable for transmitting all of the circuits of the system, with each strap terminating in a further connector T2 which plugs into the end port 32 associated with one of the other blocks 26L and 26R. Each of these connectors T2 again accesses all of the circuits associated with the respective power block and permits transfer of all circuits either to or from the respective power block to which it is connected. This jumper 18-3 enables the improved modular powerway of this invention to be mounted on panels which form a three or four panel connection so that the plurality of circuits associated with the main panel branch or spline can be transmitted to two or more panel branches.

Figure 36:
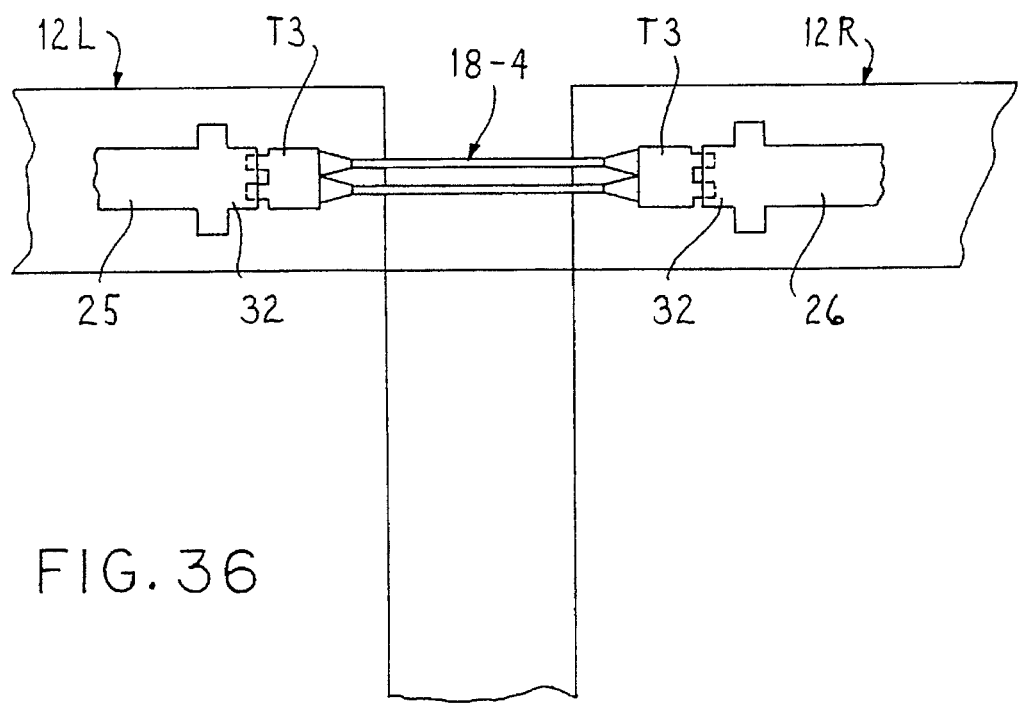
FIG. 36 is a further view similar to FIG. 34 but illustrating still a further variation.

As shown in FIG. 36, particularly in situations where a greater separation distance exists between opposed power blocks on adjacent panels, a single modified flexible electrical connector or jumper 18-4 can be provided for transferring all of the circuits between opposed power blocks on adjacent panels which mount thereon the modular powerway of this invention. In this situation, the opposed power blocks 25 and 26 as provided on the adjacent respective panels 12L and 12R are electrically connected by the electrical jumper 18-4 which has substantially identical terminal or connector portions T3 on opposite ends thereof for plugging into the port 32 associated with the respective power block. These terminals T3 are joined by one or more flexible straps which contain the plurality (here 14) of conductive wires so that all circuits (here 6) associated with the powerways are transmitted between the powerways of adjacent panels. Each connector T3, in a fashion which is also applicable to the connectors T1 and T2 described above, has two sidewardly-spaced vertical rows of shroud-enclosed contacts associated therewith, and these two rows plug into the respective port 32 so as to permit electrical connection with all of the six circuits associated with the power block while at the same time maintaining the distinctiveness of the two groupings of circuits which are associated with opposite sides of each power block.

Figure 37:
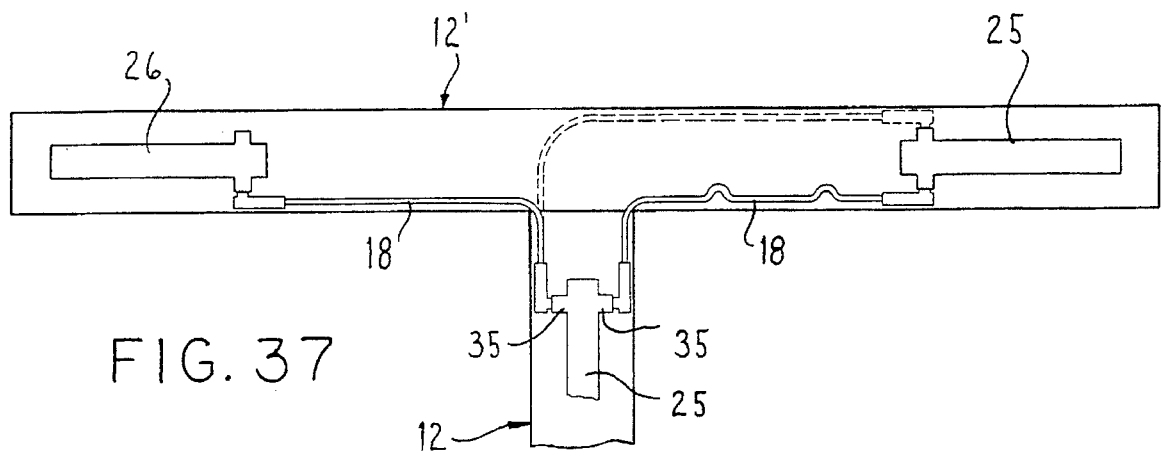
FIG. 37 diagrammatically illustrates a electrical connection of two power panels according to the invention when one of the panels has its edge connected transversaly to the other panel at a location intermediate the edges of the other panel.

Referring now to FIG. 37, there is illustrated a variation of the invention wherein a panel 12 of the invention connects perpendicularly to a second panel 12' with each of the panels 12 and 12' having the modular powerway of this invention associated therewith, such being schematically depicted in the drawings solely by the diagrammatic illustration of the power block 25 associated with one end of the panel 12, and the power blocks 25 and 26 associated with opposite ends of the other panel 12'. In this variation, however, the end edges of the panels are not disposed directly adjacent one another, but rather the vertical end edge of the panel 12 is disposed substantially in abutting relationship with one side face of the panel 12' substantially between the vertical end edges thereof, such as typically at the middle thereof. The panel 12 in this variation is secured to the panel 12' by special securing clips or brackets which generally couple the panel 12 to the panel 12' adjacent the upper and lower edges thereof, such bracket being known in the industry. To permit electrical energy to be transmitted between the two electrified panels 12 and 12' when disposed in the specialized T-connector relationship shown in FIG. 37, two flexible electrical connectors or jumpers 18 are provided, which two jumpers 18 have the connectors at one end thereof plugged into the opposed ports 35 associated with the power block 25 on the intersecting panel 12. The straps associated with the two jumpers 18 are then disposed so as to extend along the raceway associated with the other panel 12' so that the other end of one jumper 18 plugs into the power block 26 provided at one end of the panel 12', and the other jumper 18 plugs into the power block 25 associated with the other end of the panel 12'. In this fashion, all circuits associated with the modular powerway can be transferred between the panels 12 and 12' while at the same time maintaining the distinctiveness of the two subsets of circuits.

If desired, both straps can be extended interiorly along the raceway so as to plug into the same power block provided on the panel 12', this relationship being depicted by dotted lines in FIG. 37. In addition, the straps associated with the jumpers 18 can be provided with flexible hinges or deviations therein so as to provide for greater length adjustability so as to accommodate connections of this type.

While the preferred embodiment of the invention as described above depicts the use of fourteen conductors associated with the power blocks so as to define the six circuits, it will be appreciated that the circuit subsets associated with each side of the power block could each be provided with separate isolated and common grounds, rather than sharing the common and isolated grounds between the two circuit subsets, whereby sixteen conductors would be provided within each power block, and similarly sixteen conductive wires would be provided for connecting the two power blocks of each modular powerway together.

In addition, while the invention discloses the circuit subsets associated with each side of each power block as involving three circuits which are all distinct from the three circuits associated with the subset on the other side of the power block, it will be appreciated that the two circuit subsets associated with opposite sides of the power block can share some of the circuits if necessary or desirable. However, in accordance with the present invention, each circuit subset as associated with each side of the power block will each have at least one, and preferably more than one, circuit which is distinct from the circuits associated with the other circuit subset of the same power block.

While the present invention preferably employs a modular powerway for mounting on a panel wherein the powerway employs two power blocks which are longitudinally spaced apart so that the two power blocks are thus disposed on opposite sides of a central vertical plane which perpendicularly bisect the panel into longitudinal halves, whereby each power block is thus disposed more closely adjacent one edge of the panel than the other edge, nevertheless it will be appreciated that in some instances the modular powerway of the present invention may involve only a single power block per panel, such being particularly suitable for use on smaller panels such as panels of about 24-inch width or less.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an interior space-dividing wall system including at least first, second and third upright panels respectively having first, second and third upright end edges disposed in close proximity to one another, and first, second and third electrical power blocks mounted respectively on said first, second and third panels, a first electrical connector joined between said first and second power blocks for transmitting electrical energy therebetween, and a second electrical connector joined between said first and third power blocks for transmitting electrical energy therebetween, each said electrical connector having connector portions adjacent opposite ends thereof which create a releasable plug-type engagement with connector ports on the respective power blocks, said first electrical connector having the connector portion at one end thereof engaged with a first said connector portion on said first power block, the connector port at the other end of said first electrical connector being engaged with a said connector port on said second power block, said second electrical connector having a connector portion at one end thereof engaged with a second said connector port on said first power block, and a connector portion on the other end of said second electrical connector being engaged with a said connector port on said third power block, comprising the improvement wherein:

said first power block includes a plurality of electrical conductors therein for defining a plurality of electrical circuits, said first connector port associated with said first power block accessing only a first subset of said plurality of circuits, said second connector port associated with said first power block accessing only a second subset of said plurality of circuits, each of said first and second subsets including a number of circuits which is at least two but less than said plurality, and each said subset including at least one circuit which is distinct from all of the circuits of the other subset;

said first and second electrical connectors each containing thereon a plurality of electrical conductors which define a predetermined number of circuits equal to the respective subset, said first electrical connector connecting only said first subset of said plurality of circuits to said second power block, said second electrical connector connecting only said second subset of said plurality of circuits to said third power block.

2. A system according to claim 1, wherein said second power block includes therein a plurality of conductors which define a select number of circuits equal to only said first subset.

3. A system according to claim 2, wherein said second power block has two said electrical connector ports, each of which is engageable with said electrical connector.

4. A system according to claim 2, including a fourth panel provided with a fourth upright end edge which is disposed in close proximity to said first upright end edge, a fourth electrical power block mounted on said fourth panel, said fourth power block being substantially identical to said first power block in that it defines thereon first and second connector ports which each respectively access a different subset of the electrical circuits which are defined within said fourth power block, said third power block being substantially identical to said second power block, a third electrical connector joined between said second and fourth power blocks, and a fourth electrical connector joined between said third and fourth power blocks, each of said third and fourth electrical connectors being joined to the respective power blocks by releasable plug type electrical connections.

5. A wall system according to claim 1, wherein said first panel includes a pair of said first power blocks mounted thereon in longitudinally spaced relation and interconnected by a plurality of electrical conductors so that each of said first power blocks defines the same plurality of circuits therein.

6. A wall system according to claim 1, wherein said first power block has a pair of third electrical connector ports provided thereon, said pair of third connector ports being disposed on opposite sides of and accessible from opposite sides of said first power block, said third connector ports being substantially identical and each being adapted to create a releasable plug-type electrical engagement with a separable output unit which defines therein at least one three-hole electrical socket, the third connector port on one side of said first power block accessing solely the circuits of said first subset, the third connector port on the other side of said first power block accessing solely the circuits of said second subset.

7. A wall system according to claim 1, including a fourth panel serially connected to said first panel and defining thereon a fourth power block which is electrically interconnected to said first power block and defines therein said plurality of circuits, and an electrical feed assembly for connecting said plurality of electrical circuits into an electrical system which includes said first and fourth power blocks, said electrical feed assembly including an external raceway containing a plurality of conductors which define said plurality of circuits and which projects into a panel raceway containing one of said first and fourth power blocks, said external raceway terminating in a pair of connectors which each terminate in a connector portion which creates a plug-type electrical engagement with one of said first and fourth power blocks, each last-mentioned connector and the respective connector portion accessing solely one of said subsets of said plurality of circuits so that the totality of said plurality of circuits are connected to the respective power block only when both of said last-mentioned connectors are engaged therewith.

8. A system according to claim 1, wherein all of the circuits of one said subset are distinct from all of the circuits of the other subset.

9. An interior space-dividing wall system, comprising:

first and second upright space-dividing wall panels horizontally serially joined together;

first and second electrical power blocks respectively mounted on said first and second panels, said power blocks being disposed generally between vertical planes which define opposite side surfaces of the respective panels;

first and second electrical connector units joined between said first and second power blocks for transmitting electrical energy therebetween, each said connector unit having a releasable pluglike electrical connection with each of said first and second power blocks;

at least one electrical output unit for releasable pluglike engagement with one of said power blocks, said output unit defining at least one three-hole electrical socket for accommodating a two or three prong electrical plug;

each said power block including a set of electrically conductive members which define a plurality of electrical circuits;

said set of conductive members including first and second subsets of conductive members which respectively define first and second groupings of at least two electrical circuits each, at least one circuit of each grouping being distinct from the circuits of the other grouping;

said set of conductive members also including at least one ground conductor;

each said power block including a pair of substantially identical first electrical ports provided on an outer end of said power block and each adapted for pluglike engagement with one end of a said electrical connector unit;

each said power block including a pair of substantially identical second electrical ports each adapted for pluglike engagement with one of said output units, said second electrical ports as defining said pair being provided on and accessible from opposite sides of said power block;

one of said first ports and one of said second ports each including a plurality of electrical terminals which are respectively connected to the conductors of said first subset so that said one first port and said one second port each access only said first grouping of circuits;

the other said first port and the other said second port each including a plurality of electrical terminals which are respectively connected to the conductors of said second subset so that said other first port and said other second port each access only said second grouping of circuits;

said first electrical connector unit having one end thereof engaged with one of said first ports and said second electrical connector unit having one end thereof engaged with the other of said first ports, said first and second electrical connector units respectively connecting said first and second grouping of circuits between said first and second power blocks.

10. A wall system according to claim 9, wherein each said power block includes a third electrical port for permitting an electrical power in-feed assembly to be connected to said power block by a plug-type engagement for connecting said plurality of electrical circuits to said power block, said third electrical port having a plurality of electrical terminals which are respectively connected to all of the conductive members of said set so as to access all of the circuits of both groupings.

11. A wall system according to claim 10, wherein said third port includes two sets of terminals with the terminals of one set being connected only to the circuits of one grouping and the terminals of the other set being connected only to the circuits of the other grouping.

12. A wall system according to claim 11, wherein said third port is provided at an outer end of the respective power block and faces in an endwise direction, and wherein the pair of first ports are disposed closely adjacent and slightly inwardly of said third port, said first ports facing sidewardly of said power block in opposite outward directions.

13. A wall system according to claim 10, wherein each said power block has a pair of substantially identical fourth electrical ports which are provided adjacent opposite sides of the respective power block and are each adapted for pluglike engagement with one part of a two-part electrical feed supply assembly, one said fourth port having terminals which are coupled to and access solely said one grouping of circuits, and the other of said fourth ports having terminals which are connected to and access solely the other grouping of said circuits.

14. A wall system according to claim 9, wherein each said power block has a pair of substantially identical third electrical ports which are provided adjacent opposite sides of the respective power block and are each adapted for pluglike engagement with one part of a two-part electrical feed supply assembly, one said third port having terminals which are coupled to and access solely said one grouping of circuits, and the other of said third ports having terminals which are connected to and access solely the other grouping of said circuits.

15. A wall system according to claim 14, including a power feed assembly connectable to one of said power blocks for connecting said plurality of electrical circuits thereto, said power feed assembly having an elongate electrical conduit providing a plurality of conductive wires therein for defining said plurality of circuits, one end of said conduit being adapted for connection to an electrical power source, said conduit at its other end being connected to a mounting block which secures to said panel, and a pair of flexible and elongated power transmitting parts cantilevered from said mounting block and each accessing therethrough only one of said groupings of electrical circuits, each said power transmitting part terminating in electrical terminals which creates a pluglike engagement with one of said third ports for connecting the electrical circuits of the respective grouping to the power block.

16. A wall system according to claim 9, wherein said first and second panels respectively mount thereon third and fourth power blocks which are longitudinally spaced from the respective first and second power blocks, and first and second multi-conductor conduits respectively provided on said first and second panels for electrically connecting the two power blocks of the respective panel for connecting said plurality of circuits therebetween, said third and fourth power blocks being substantially identical to the respective first and second power blocks.

17. In an upright space-dividing interior wall panel having a raceway extending longitudinally thereof between opposite vertically-extending end edges of the panel, and a pair of electrical power blocks mounted on said panel within said raceway in longitudinally spaced relation, the pair of power block being joined by a multi-conductor conduit for transmitting electrical energy between said pair of power blocks, the improvement wherein each said power block comprises:

a housing defining an interior chamber in which a plurality of electrically conductive members are supportingly positioned in spaced relation to one another, said plurality of conductive members defining first and second subsets of different conductors which respectively define first and second groupings of electrical circuits, each said grouping defining at least two electrical circuits, the two electrical circuits of one said grouping being distinct from the two electrical circuits of the other grouping;

each said power block including a pair of substantially identical first electrical connector ports provided adjacent an outer end of said power block and each adapted for pluglike engagement with one end of an electrical connector unit, each said first port accessing only a respectively different one of said groupings of circuits; and each said power block including a pair of substantially identical second electrical connector ports each adapted for pluglike engagement with a separable output unit, said second electrical connector ports as defining said pair being provided on and accessible from opposite sides of said power block, each said second port accessing only a respectively different one of said groupings of circuits.

18. A wall panel according to claim 17, wherein each said power block includes a third electrical connector port for permitting an electrical power in-feed assembly to be connected to said power block by a plug-type engagement for connecting all of said electrical circuits to said power block.

19. An interior space-dividing wall system, comprising;

first and second upright space-dividing wall panels horizontally serially joined together;

first and second electrical power blocks respectively mounted on said first and second panels, said power blocks being disposed generally between vertical planes which define opposite side surfaces of the panels;

at least one electrical connector unit joined between said first and second power blocks for transmitting electrical energy therebetween, said connector unit having a releasable pluglike electrical connection with each of said first and second power blocks;

each said power block including a set of electrically conductive members which define a plurality of electrical circuits;

said set of conductive members including first and second subsets of conductive members which respectively define first and second groupings of at least two electrical circuits each, at least one circuit of each grouping being distinct from the circuits of the other grouping;

said set of conductive members also including at least one ground conductor;

each said power block including a first electrical port provided adjacent an outer end of said power block for pluglike engagement with one end of said electrical connector unit;

each said power block including a pair of substantially identical second electrical ports each adapted for pluglike engagement with an output unit, said second electrical ports as defining said pair being provided on and accessible from opposite sides of said power block so that one of said second ports is accessible only from one side of said power block and the other said second port is accessible only from the other side of said power block;

said one second port including a plurality of electrical terminals which are respectively connected to the conductors of only said first subset so that said one second port can access only said first grouping of circuits;

said other second port including a plurality of electrical terminals which are respectively connected to the conductors of only said second subset so that said other second port can access only said second grouping of circuits; and at least one receptacle-type electrical output unit for releasable pluglike engagement with one of the second ports of one said power block, said output unit defining at least one three-hole electrical receptacle for accommodating a two or three prong electrical plug;

whereby said first grouping of circuits is accessible for connection to a receptacle-type outlet unit only from said one side of said power block, and wherein said second grouping of circuits is accessible for connection to a receptacle-type outlet unit only from the other side of said power block.

20. A wall system according to claim 19, wherein each said power block includes a third electrical port for permitting an electrical power in-feed assembly to be connected to said power block by a plug-type engagement for connecting said plurality of electrical circuits to said power block, said third electrical port having a plurality of electrical terminals which are respectively connected to all of the conductive members of said set so as to access all of the circuits of both groupings.

21. A wall system according to claim 19, wherein each said power block has a pair of substantially identical said first electrical ports which are provided adjacent opposite sides of the respective power block and are each adapted for pluglike engagement with one end of a said electrical connector unit.

22. A wall system according to claim 19, wherein each said power block has a pair of substantially identical third electrical ports which are provided adjacent opposite sides of the respective power block and are each adapted for pluglike engagement with one part of a two-part electrical feed supply assembly, one said third port having terminals which are coupled to and access solely said one grouping of circuits, and the other of said third ports having terminals which are connected to and access solely the other grouping of said circuits.

23. A wall system according to claim 19, wherein said first and second panels respectively mount thereon third and fourth power blocks which are longitudinally spaced from the respective first and second power blocks, and first and second multi-conductor conduits respectively provided on said first and second panels for electrically connecting the two power blocks of the respective panel for connecting said plurality of circuits therebetween, said third and fourth power blocks being substantially identical to the respective first and second power blocks.

24. A wall system according to claim 19, wherein the one distinct circuit of one grouping is accessible for connection to an output unit on only one side of the respective power block, and wherein the one distinct circuit of the other grouping is accessible for connection to an output unit on only the other side of the respective power block.

* * * * *

UNITED STATES PATENT AND TRADEMARK OFFICE
CERTIFICATE OF CORRECTION

PATENT NO. : 5 607 317
DATED : March 4, 1997
INVENTOR(S) : Steven J. King et al

It is certified that error appears in the above-indentified patent and that said Letters Patent is hereby corrected as shown below:

Column 21, lines 14 and 15; change
"connector portion on said first power block, the connector port" to
---connector port on said first power block, the connector portion---.

Signed and Sealed this

Fourteenth Day of October, 1997

*Attest:*

BRUCE LEHMAN

*Attesting Officer*  *Commissioner of Patents and Trademarks*